(12) United States Patent
Wilhelm

(10) Patent No.: US 10,655,966 B2
(45) Date of Patent: May 19, 2020

(54) VEHICLES, VEHICLE CONTROLLER SYSTEMS, METHODS FOR CONTROLLING A VEHICLE, AND METHODS FOR CONTROLLING A PLURALITY OF VEHICLES

(71) Applicant: Singapore University of Technology and Design, Singapore (SG)

(72) Inventor: Erik Wilhelm, Singapore (SG)

(73) Assignee: SINGAPORE UNIVERSITY OF TECHNOLOGY AND DESIGN, Singapore (SG)

(*) Notice: Subject to any disclaimer, the term of this patent is extended or adjusted under 35 U.S.C. 154(b) by 125 days.

(21) Appl. No.: 15/547,383

(22) PCT Filed: Jan. 29, 2016

(86) PCT No.: PCT/SG2016/050045
§ 371 (c)(1),
(2) Date: Jul. 28, 2017

(87) PCT Pub. No.: WO2016/122413
PCT Pub. Date: Aug. 4, 2016

(65) Prior Publication Data
US 2018/0010915 A1    Jan. 11, 2018

(30) Foreign Application Priority Data

Jan. 30, 2015  (SG) ............................ 10201500764V

(51) Int. Cl.
*G05D 1/02*  (2020.01)
*G01C 21/20*  (2006.01)
*G06K 9/00*  (2006.01)

(52) U.S. Cl.
CPC .......... *G01C 21/20* (2013.01); *G05D 1/0242* (2013.01); *G05D 1/0291* (2013.01);
(Continued)

(58) Field of Classification Search
CPC combination set(s) only.
See application file for complete search history.

(56) References Cited

U.S. PATENT DOCUMENTS 5,680,313 A * 10/1997 Whittaker .......... B60K 31/0008
340/436
6,580,978 B1 * 6/2003 McTamaney ........ G01C 21/165
342/385
(Continued)

FOREIGN PATENT DOCUMENTS

WO        0169041 A1    9/2001
WO     2001069041 A1    9/2001

OTHER PUBLICATIONS

Vogel, et al.; Understanding Bike-Sharing Systems Using Data Mining: Exploring Activity Patterns; Elsevier Ltd., ScienceDirect, Procedia Social and Behavioral Sciences 20 (2011) 514-523; University of Braunschweig, Decision Support Group, Muhlenpfordtstrabe 23, D-38106 Braunschweig, Germany.
(Continued)

*Primary Examiner* — Redhwan K Mawari
(74) *Attorney, Agent, or Firm* — Bracewell LLP; Brad Y. Chin

(57) ABSTRACT

According to various embodiments, a vehicle may be provided. The vehicle may include: a sensor configured to sense a marking, wherein the marking is at least substantially not visible to the human eye under a natural lighting condition; and a localization circuit configured to determine a location of the vehicle based on the sensing of the sensor.

18 Claims, 18 Drawing Sheets

(52) U.S. Cl.
CPC ... *G05D 1/0297* (2013.01); *G05D 2201/0212* (2013.01); *G06K 9/00798* (2013.01); *G06K 9/00805* (2013.01)

(56) References Cited

U.S. PATENT DOCUMENTS

| | | | | |
|---|---|---|---|---|
| 7,340,076 | B2* | 3/2008 | Stach | G06T 1/0021 382/100 |
| 2004/0073360 | A1* | 4/2004 | Foxlin | G01C 21/16 701/517 |
| 2010/0100716 | A1* | 4/2010 | Scott | G06F 1/3209 713/1 |
| 2011/0043515 | A1* | 2/2011 | Stathis | G01C 15/002 345/419 |
| 2012/0200259 | A1* | 8/2012 | Sullivan | G06Q 20/105 320/109 |
| 2013/0054029 | A1* | 2/2013 | Huang | B25J 5/005 700/259 |
| 2013/0223673 | A1* | 8/2013 | Davis | G06K 9/78 382/100 |
| 2013/0329971 | A1* | 12/2013 | Oddou | G06K 9/2018 382/118 |
| 2015/0015419 | A1* | 1/2015 | Halker | B60L 11/1846 340/901 |
| 2015/0126834 | A1* | 5/2015 | Wang | A61B 5/6833 600/345 |
| 2018/0010915 | A1* | 1/2018 | Wilhelm | G01C 21/20 |

OTHER PUBLICATIONS

Raviv, et al.; Static Repositioning in a Bike-Sharing System: Models and Solution Approaches, EURO J. Transp. Logist., vol. 2, No. 3, pp. 187-223, Aug. 2013.

Caggiani, et al.; A Modular Soft Computing Based Method for Vehicles Repositioning in Bike-Sharing Systems; Procedia—Soc. Behav. Sci., vol. 54, pp. 675-684, Oct. 2012.

Elcano Project; Therory; Oct. 27, 2017; http://www.elcanoproject.org/therory.php.

vislab.it; Automotive Highlights VisLab; 20017; http://vislab.it/automotive/.

Demaio; Bike-Sharing: History, Impacts, Models of Provision, and Future, Journal of Public Transportation, vol. 12, No. 4, pp. 41-56, Jan. 2009.

Magnusson; The Bike-Sharing Planning Guide, Institute for Transportation and Development Policy, 2013.

Midgley; The Role of Smart Bike-Sharing Systems in Urban Mobility, Journeys, vol. 2, pp. 23-31, 2009.

Kaltenbrunner, et al.; Urban Cycles and Mobility Patterns: Exploring and Predicting Trends i a Bicycle-Based Public Transport System; Pervasive Mob. Comput., vol. 6, No. 4, pp. 455-466, Aug. 2010.

Beznos, et al.; Control of Autonomous Motion of Two-Wheel Bicycle with Gyroscopic Stabilisation, in 1998 IEEE International Conference on Robotics and Automation, 1998. Proceedings, 1998, vol. 3, pp. 2670-2675 vol. 3.

Tanaka, et al.; Self Sustaining Bicycle Robot with Steering Controller, in The 8th IEEE International Workshop on Advanced Motion Control, 2004. AMC '04, 2004, pp. 193-197.

Kooijman; A Bicycle Can Be Self-Stable without Gyroscopic or Caster Effects, Science, vol. 332, No. 6027, pp. 339-342, Apr. 2011.

Nair, et al.; Fleet Management for Vehicle Sharing Operations, Transp. Sci., vol. 45, No. 4, pp. 524-540, Nov. 2011.

PCT/SG2016/050045 International Search Report dated Apr. 11, 2016; 22 pgs.

PCT/SG2016/050045 International Written Opinion dated Apr. 11, 2016, 7 pgs.

* cited by examiner

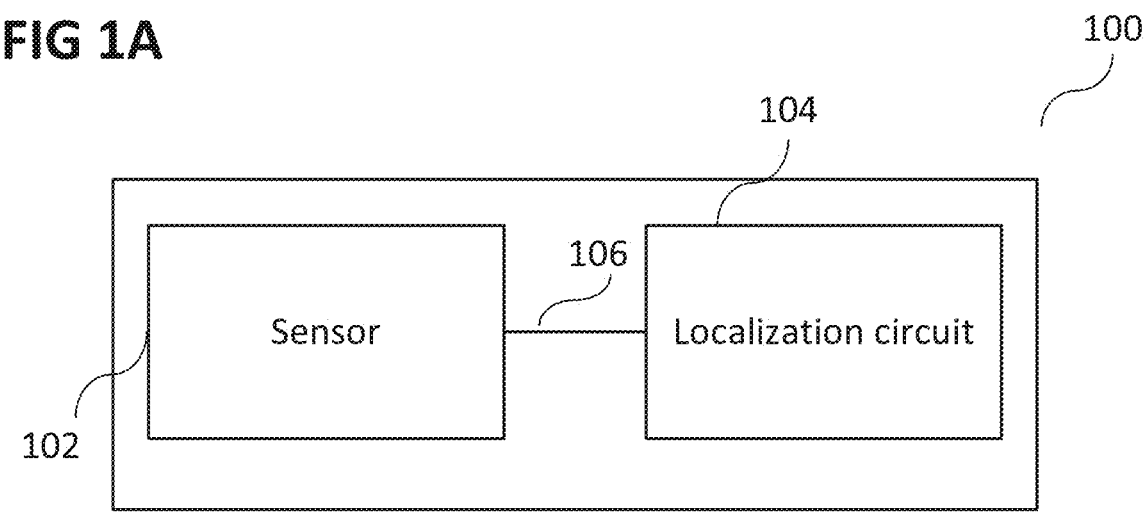
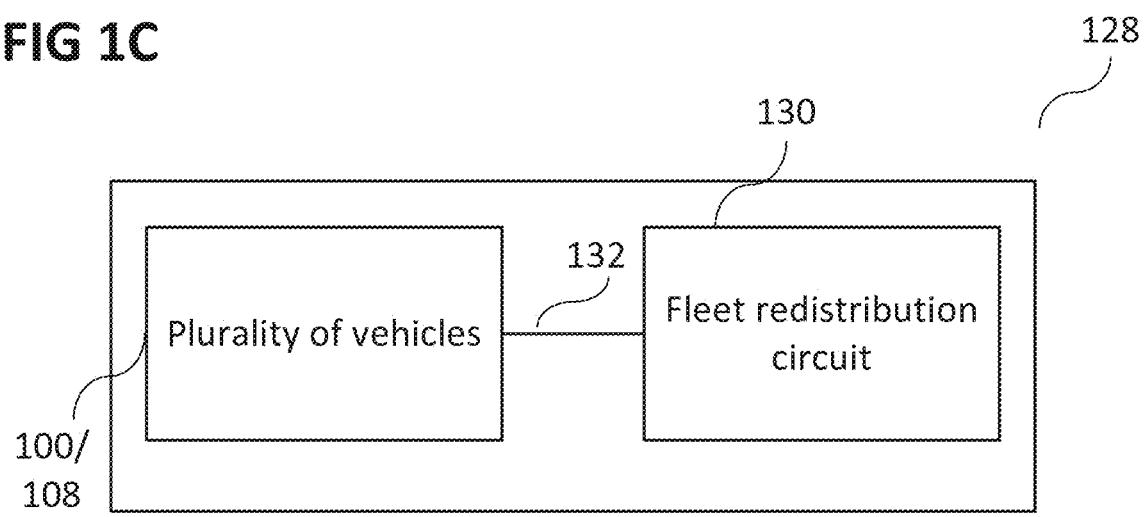
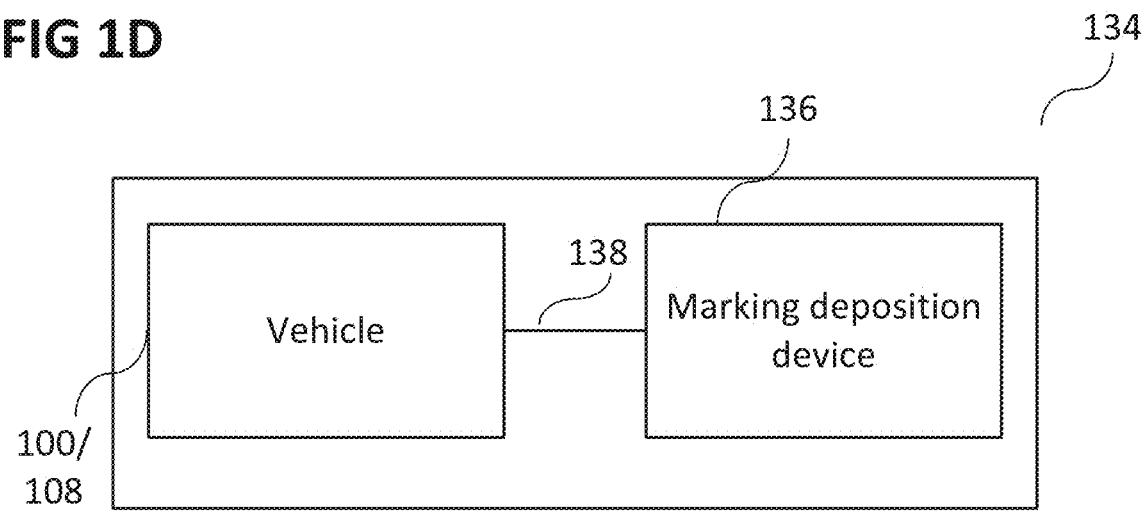

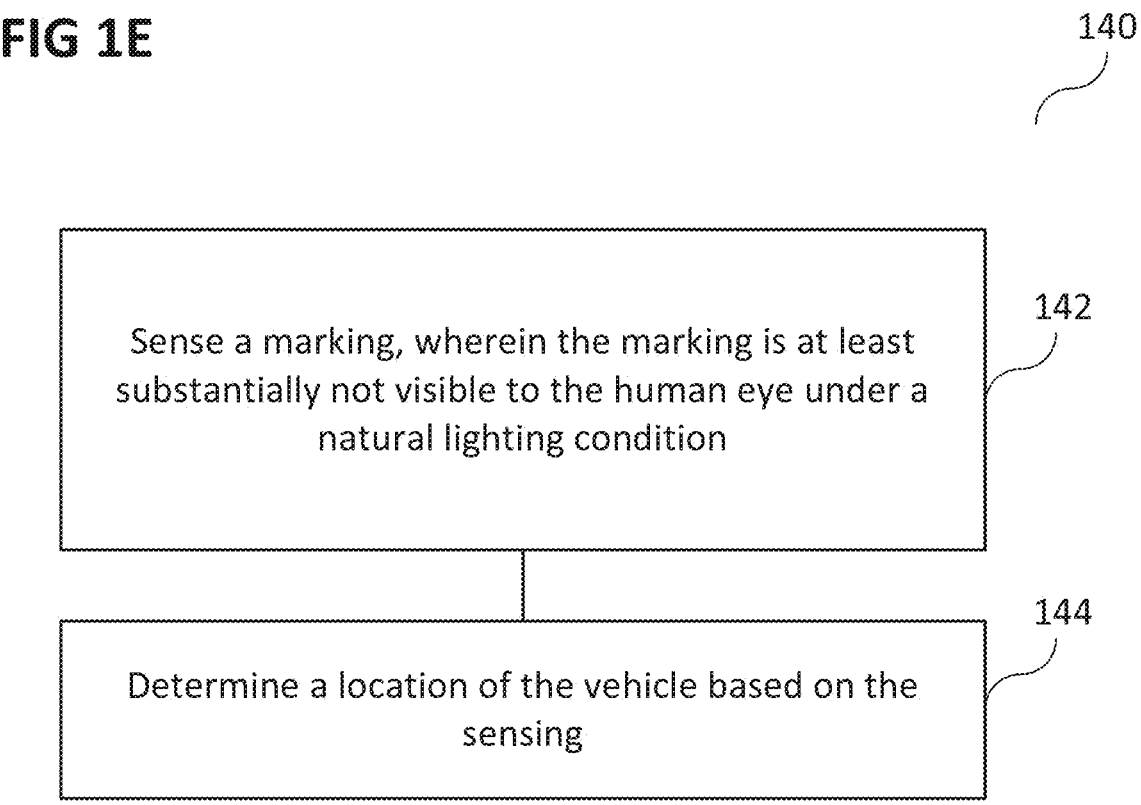

1304

1400

VEHICLES, VEHICLE CONTROLLER SYSTEMS, METHODS FOR CONTROLLING A VEHICLE, AND METHODS FOR CONTROLLING A PLURALITY OF VEHICLES

CROSS-REFERENCE TO RELATED APPLICATIONS

The present application claims the benefit of and priority to PCT/SG2016/050045, filed on Jan. 29, 2016, entitled, "VEHICLES, VEHICLE CONTROLLER SYSTEMS, METHODS FOR CONTROLLING A VEHICLE, AND METHODS FOR CONTROLLING A PLURALITY OF VEHICLES," which claims the benefit of and priority to Singapore patent application No. 10201500764V, filed on 30 Jan. 2015, each of which is hereby incorporated herein by reference in their entirety into this application.

TECHNICAL FIELD

Embodiments relate generally to vehicles, vehicle controller systems, methods for controlling a vehicle, and methods for controlling a plurality of vehicles.

BACKGROUND

In order to meet the travel demands of a growing urban population, particularly in first and last mile scenarios, large cities are increasingly promoting alternatives to personal cars, and often these involve cycling. Thus, there may be a need for enhanced systems for mobility on demand.

SUMMARY

According to various embodiments, a vehicle may be provided. The vehicle may include: a sensor configured to sense a marking, wherein the marking is at least substantially not visible to the human eye under a natural lighting condition; and a localization circuit configured to determine a location of the vehicle based on the sensing of the sensor.

According to various embodiments, a vehicle controller system may be provided. The vehicle controller system may include: a plurality of vehicles; and a fleet redistribution circuit configured to control each vehicle of the plurality of vehicles based on at least one of a history of usage patterns of the plurality of vehicles or publicly available transportation system information.

According to various embodiments, a vehicle controller system may be provided. The vehicle controller system may include: a vehicle; and a marking deposition device configured to provide a marking which is at least substantially not visible to the human eye under a natural lighting condition.

According to various embodiments, a method for controlling a vehicle may be provided. The method may include: sensing a marking, wherein the marking is at least substantially not visible to the human eye under a natural lighting condition; and determining a location of the vehicle based on the sensing.

According to various embodiments, a method for controlling a plurality of vehicles may be provided. The method may include: controlling a plurality of vehicles; and controlling each vehicle of the plurality of vehicles based on at least one of a history of usage patterns of the plurality of vehicles or publicly available transportation system information.

According to various embodiments, a method may be provided. The method may include providing a marking which is at least substantially not visible to the human eye under a natural lighting condition using a marker deposition device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 1A shows a vehicle according to various embodiments;

FIG. 1C and FIG. 1D show vehicle controller systems according to various embodiments;

FIG. 1E shows a flow diagram illustrating a method for controlling a vehicle according to various embodiments;

DESCRIPTION

Figure 1B:
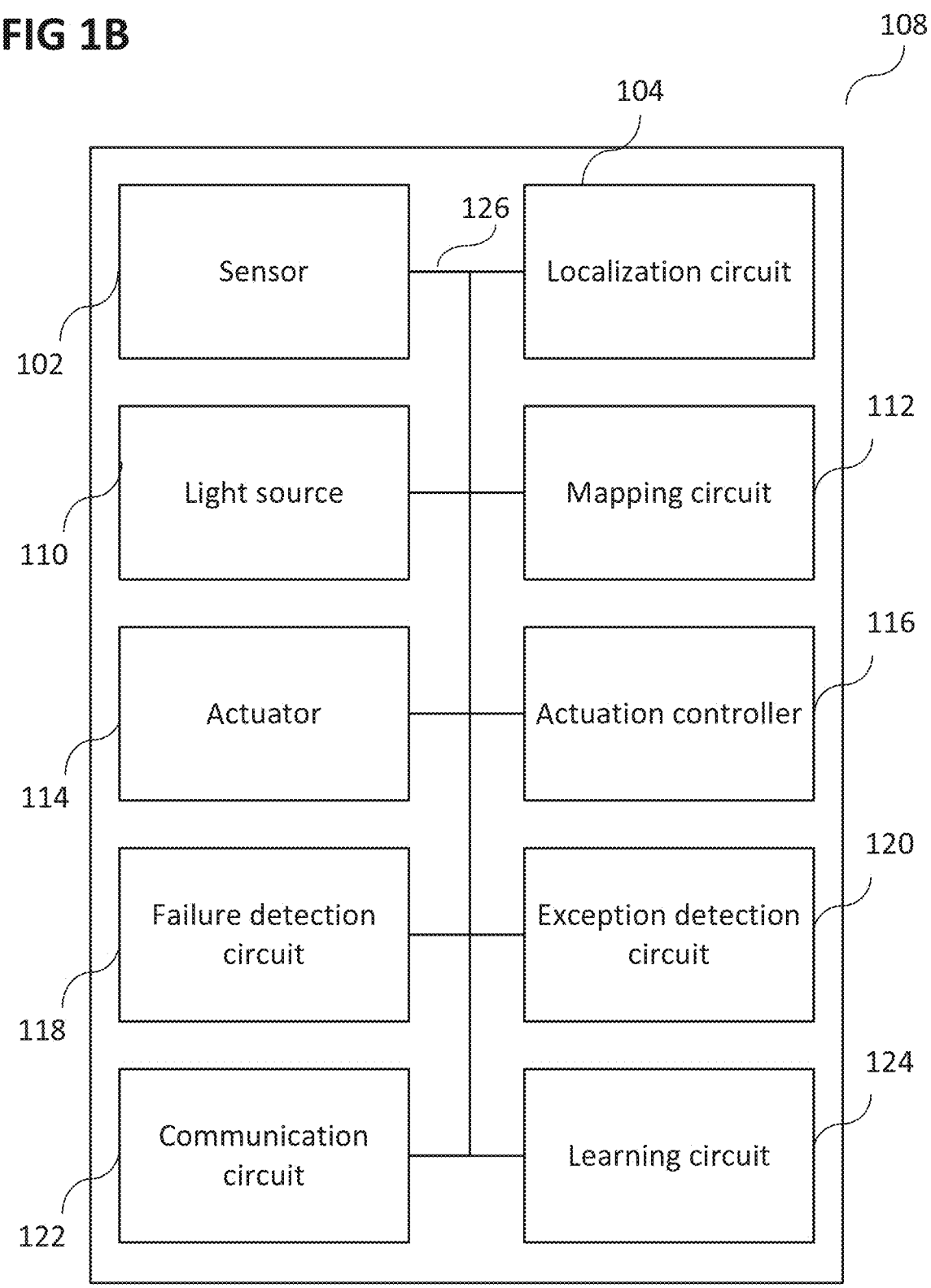
FIG. 1B shows a vehicle according to various embodiments.

Embodiments described below in context of the devices are analogously valid for the respective methods, and vice versa. Furthermore, it will be understood that the embodiments described below may be combined, for example, a part of one embodiment may be combined with a part of another embodiment.

In this context, the vehicle as described in this description may include a memory which is for example used in the processing carried out in the vehicle. In this context, the vehicle controller system as described in this description may include a memory which is for example used in the processing carried out in the vehicle controller system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Various embodiments may be related to control systems used for enabling self-driving vehicles, self-driving systems, autonomous systems (for example autonomous vehicles, for example electric bicycles), real-time control, computer vision, simultaneous localization and mapping, robotic path planning, mobility on demand, assisted mobility, self-delivering packages, autonomous logistics, and dynamical system control.

Various embodiments may enable self-rebalancing vehicle fleets, may increase the safety of electric assisted-mobility devices for the elderly, and/or may provide airport systems and/or may enable self-delivering packages.

According to various embodiments, the General Autonomy Controller (GAC) may enable the safe deployment and efficiently management of self-driving vehicles which are not subject to the same constraints as full sized passenger vehicles.

According to various embodiments, a real-time control system may be provided. Controllers according to various embodiments for multiple types of public use vehicles may be rugged, multi-functional, and rapidly transformable. According to various embodiments, autonomy controllers may be low-cost (for example in order to not pose tempting targets for thieves).

According to various embodiments, devices and method for computer vision and infrastructure marking systems may be provided. Various devices and methods may be provided for environmental sensing and action planning, in order to safely navigate public roads and pedestrian walk-ways while building virtual maps of the surroundings. Various devices and methods may be provided for identification and avoidance of stochastic events (e.g. pedestrians walking in front of the vehicle).

According to various embodiments, devices and method for mission planning for fleets of shared and logistics vehicles. Optimal allocation of fleet resources may be provided for logistics systems such as freight and delivery operations, or for shared personal mobility. Devices and methods may be provided for the timeliness of communication between vehicles and operators, and for ensuring that allocation methods can function with uncertain data.

FIG. 1A shows a vehicle 100 according to various embodiments. The vehicle 100 may include a sensor 102 configured to sense a marking. The marking may be at least substantially not visible to the human eye under a natural lighting condition. The marking may be deposited by the vehicle (for example by the apparatus shown in FIG. 14). The vehicle 100 may further include a localization circuit 104 configured to determine a location of the vehicle 100 based on the sensing of the sensor 102. The sensor 102 and the localization circuit 104 may be coupled with each other, like indicated by line 106, for example electrically coupled, for example using a line or a cable, and/or wirelessly coupled and/or mechanically coupled.

In other words, a vehicle according to various embodiments may determine its location based on markings which can be determined by the vehicle, but which are not visible to humans. It will be understood that a marking which is not visible to humans is a marking which, without any further technical means, is not visible to humans.

According to various embodiments, the marking may include or may be a pre-determined material, wherein the pre-determined material is not visible to the human eye under a natural lighting condition (in other words: under a lighting condition in which mainly light in the visible range is present).

According to various embodiments, the marking may include or may be an engraving with a length in a range between 0.1 mm and 100 mm. According to various embodiments, the marking may include or may be an engraving with a width in a range between 0.1 mm and 100 mm.

According to various embodiments, the marking may include or may be a chemical substance which is configured to be sensed using chemosensing.

According to various embodiments, the pre-determined material may include or may be a liquid material.

According to various embodiments, the pre-determined material may include or may be a material configured to dry after application.

According to various embodiments, the pre-determined material may include or may be an ink.

According to various embodiments, the sensor 102 may include or may be a light sensor. According to various embodiments, the vehicle may self-deposit markings, for example like illustrated in FIG. 14.

FIG. 1B shows a vehicle 108 according to various embodiments. The vehicle 108 may, similar to the vehicle 100 of FIG. 1A, include a sensor 102 configured to sense a marking. The marking may be at least substantially not visible to the human eye under a natural lighting condition. The vehicle 108 may, similar to the vehicle 100 of FIG. 1A, further include a localization circuit 104 configured to determine a location of the vehicle 100 based on the sensing of the sensor 102. The vehicle 108 may further include a light source 110, like will be described in more detail below. The vehicle 108 may further include a mapping circuit 112, like will be described in more detail below. The vehicle 108 may further include an actuator 114, like will be described in more detail below. The vehicle 108 may further include an actuation controller 116, like will be described in more detail below. The vehicle 108 may further include a failure detection circuit 118, like will be described in more detail below. The vehicle 108 may further include an exception detection circuit 120, like will be described in more detail below. The vehicle 108 may further include a communication circuit 122, like will be described in more detail below. The vehicle 108 may further include a learning circuit 124, like will be described in more detail below. The sensor 102, the localization circuit 104, the light source 110, the mapping circuit 112, the actuator 114, the actuation controller 116, the failure detection circuit 118, the exception detection circuit 120, the communication circuit 122, and the learning circuit 124 may be coupled with each other, like indicated by lines 126, for example electrically coupled, for example using a line or a cable, and/or mechanically coupled.

According to various embodiments, the light source 110 may be configured to illuminate an environment of the vehicle 108.

According to various embodiments, the light source 110 may be configured to illuminate the environment of the vehicle 108 with a lighting condition different from the natural lighting condition (for example different with respect to wavelength or different with respect to intensity or different with respect to polarization).

According to various embodiments, the light source 110 may include or may be an ultra violet light source.

According to various embodiments, the natural lighting condition may include or may be a lighting condition with light in a wavelength range visible for the human eye.

According to various embodiments, the natural lighting condition may include or may be a lighting condition with light in a wavelength range between 380 nm and 780 nm.

According to various embodiments, the vehicle 108 may include or may be a car, and/or a bicycle, and/or an aircraft, and/or an airplane, and/or a helicopter, and/or a drone, and/or a vessel, and/or a spacecraft, and/or a rocket.

According to various embodiments, the mapping circuit 112 may be configured to determine a map of an environment of the vehicle 108.

According to various embodiments, the localization circuit 104 and the mapping circuit 112 may be configured to carry out simultaneous localization and mapping.

According to various embodiments, the actuation controller 116 may be configured to control actuation of the vehicle 108 based on the determination of the localization circuit 104.

According to various embodiments, the failure detection circuit 118 may be configured to detect a failure of the vehicle 108.

According to various embodiments, the exception detection circuit 120 may be configured to detect an exception in an operation of the vehicle 108.

According to various embodiments, the exception may include or may be at least one item from the list of items consisting of: the vehicle approaching a crossing; the vehicle standing at a crossing; the vehicle approaching a junction; the vehicle standing at a junction; the vehicle approaching another vehicle; another vehicle approaching the vehicle; an accident; the vehicle approaching a person; and a person approaching the vehicle.

According to various embodiments, the communication circuit 122 may be configured to communicate with a human operator when an exception is detected.

According to various embodiments, the communication circuit 122 may further be configured to receive remote control instructions from the human operator.

According to various embodiments, the vehicle 108 may be configured to operate according to the remote control instructions.

According to various embodiments, the learning circuit 124 may be configured to learn a desired behavior in response to an exception based on the remote control instructions.

FIG. 1C shows a vehicle controller system 128 according to various embodiments. The vehicle controller system 128 may include a plurality of vehicles (for example vehicles 100 like illustrated in FIG. 1A or vehicles 108 like illustrated in FIG. 1B). The vehicle controller system 128 may further include a fleet redistribution circuit 130 configured to control each vehicle 100/108 of the plurality of vehicles based on a history of usage patterns of the plurality of vehicles 100/108 and/or based on publicly available transportation system information. The plurality of vehicles 100/108 and the fleet redistribution circuit 130 may be coupled with each other, like indicated by line 132, for example wirelessly coupled.

FIG. 1D shows a vehicle controller system 134 according to various embodiments. The vehicle controller system 134 may include a vehicle (for example a vehicle 100 like illustrated in FIG. 1A or a vehicle 108 like illustrated in FIG. 1B). The vehicle controller system 134 may further include a marking deposition device 136 configured to provide a marking which is at least substantially not visible to the human eye under a natural lighting condition. The vehicle 100/108 and the marking deposition device 136 may be coupled with each other, like indicated by line 138, for example electrically coupled, for example using a line or a cable, and/or wirelessly coupled and/or mechanically coupled.

According to various embodiments, the marking deposition device 136 may be provided separate from the vehicle 100/108.

According to various embodiments, the marking deposition device 136 may be provided in the vehicle 100/108.

According to various embodiments, the marking deposition device 136 may include or may be a stencil configured to provide a marking in at least one of a plurality of pre-determined shapes.

According to various embodiments, the marking deposition device 136 may include or may be an engraving device.

According to various embodiments, the marking deposition device 136 may include or may be a marking controller configured to control providing of the marking.

According to various embodiments, the marking controller may be configured to provide markings at predetermined points of time.

According to various embodiments, the marking controller may be configured to provide markings at predetermined distances.

According to various embodiments, the marking deposition device 136 may further include a marking quality determination circuit configured to determine a quality of a marking.

According to various embodiments, the marking deposition device 136 may further include a marking removing member configured to remove an existing marking if the quality of the existing marking is below a pre-determined threshold.

According to various embodiments, the marking deposition device 136 may further include a marking removing member configured to remove an existing marking.

FIG. 1E shows a flow diagram 140 illustrating a method for controlling a vehicle according to various embodiments. In 142, a marking may be sensed. The marking may be at least substantially not visible to the human eye under a natural lighting condition. In 144, a location of the vehicle may be determined based on the sensing.

According to various embodiments, the marking may include or may be a pre-determined material, wherein the pre-determined material is not visible to the human eye under a natural lighting condition.

According to various embodiments, the marking may include or may be an engraving with a length in a range between 0.1 mm and 100 mm. According to various embodiments, the marking may include or may be an engraving with a width in a range between 0.1 mm and 100 mm.

According to various embodiments, the marking may include or may be a chemical substance which is configured to be sensed using chemosensing.

According to various embodiments, the pre-determined material may include or may be a liquid material.

According to various embodiments, the pre-determined material may include or may be a material configured to dry after application.

According to various embodiments, the pre-determined material may include or may be an ink.

According to various embodiments, the sensing may include or may be using an ultra violet light sensor.

According to various embodiments, the method may further include illuminating an environment of the vehicle using a light source.

According to various embodiments, the light source may illuminate the environment of the vehicle with a lighting condition different from the natural lighting condition.

According to various embodiments, the light source may include or may be an ultra violet light source.

According to various embodiments, the natural lighting condition may include or may be a lighting condition with light in a wavelength range visible for the human eye.

According to various embodiments, the natural lighting condition may include or may be a lighting condition with light in a wavelength range between 380 nm and 780 nm.

According to various embodiments, the vehicle may include or may be at least one vehicle selected from a list of vehicles consisting of: a car; a bicycle; an aircraft; an airplane; a helicopter; a drone; a vessel; a spacecraft; and a rocket.

According to various embodiments, the method may further include determining a map of an environment of the vehicle.

According to various embodiments, the method may further include carrying out simultaneous localization and mapping.

According to various embodiments, the method may further include actuating the vehicle using an actuator.

According to various embodiments, the method may further include controlling actuation of the vehicle based on determining the location.

According to various embodiments, the method may further include detecting a failure of the vehicle.

According to various embodiments, the method may further include detecting an exception in an operation of the vehicle.

According to various embodiments, the exception may include or may be at least one item from the list of items consisting of: the vehicle approaching a crossing; the vehicle standing at a crossing; the vehicle approaching a junction; the vehicle standing at a junction; the vehicle approaching another vehicle; another vehicle approaching the vehicle; an accident; the vehicle approaching a person; and a person approaching the vehicle.

According to various embodiments, the method may further include communicating with a human operator when an exception is detected.

According to various embodiments, the method may further include receiving remote control instructions from the human operator.

According to various embodiments, the method may further include controlling the vehicle according to the remote control instructions.

According to various embodiments, the method may further include learning a desired behavior in response to an exception based on the remote control instructions.

According to various embodiments, a method for controlling a plurality of vehicles may be provided. The method may include controlling a plurality of vehicles (for example with the method described above with reference to FIG. 1E). The method may further include controlling each vehicle of the plurality of vehicles based on at least one of a history of usage patterns of the plurality of vehicles or publicly available transportation system information.

According to various embodiments, a method may be provided. The method may include the method described above with reference to FIG. 1E. The method may further include providing a marking which is at least substantially not visible to the human eye under a natural lighting condition using a marker deposition device.

According to various embodiments, the marking deposition device may be provided separate from the vehicle.

According to various embodiments, the marking deposition device may be provided in the vehicle.

According to various embodiments, the method may further include providing a marking in at least one of a plurality of pre-determined shapes a stencil.

According to various embodiments, the method may further include engraving a marking.

According to various embodiments, the method may further include controlling providing of the marking.

According to various embodiments, the method may further include providing markings at predetermined points of time.

According to various embodiments, the method may further include providing markings at predetermined distances.

According to various embodiments, the method may further include determining a quality of a marking.

According to various embodiments, the method may further include removing an existing marking if the quality of the existing marking is below a pre-determined threshold.

According to various embodiments, the method may further include removing an existing marking.

According to various embodiments, the vehicle may include a communication circuit configured to communicate with a human operator when an exception is detected.

In other words, the vehicle may include an option for a human-in-the-loop, so that in cases of exception, which the vehicle cannot handle on its own, or which might be potentially dangerous, a human operator may take control of the vehicle.

According to various embodiments, the vehicle may provide markings at pre-determined times and/or pre-determined distances and/or when a poor quality of an existing marking is determined; thus, a fleet of vehicles may reinforce the deposition of the markings (for example invisible waypoint markers).

According to various embodiments, a General Autonomy Controller (GAC) may be provided which consists of (or may provide): a) a real-time processor/microprocessor control unit capable of deterministic sensing, inference, and actuation, b) a method of automatically tuning model parameters for optimal control of an autonomous vehicle, c) a vision system capable of identifying safe operating envelopes in real-time, d) a system for applying markings to the physical environment which can be used by vehicles subsequently traversing an environment, e) the ability for remote piloting of GAC-enabled vehicles, and f) the ability to save and recall key elements of paths travelled while remotely piloting vehicles to assist autonomous vehicles in their operation g) methods for deciding when a vehicle/package should be at a certain location.

In the following, a real-time controller according to various embodiments will be described.

Simplicity and minimalism in the design of the GAC may serve the dual purpose of holding costs low, as well as making the controller easy to integrate for as many possible form factors of end-use vehicles. The GAC may be provided for a broad user base, essentially to serve the needs of any wheeled electric ground vehicle such as a bicycle, a scooter, and an electrically-driven package equally well. The GAC's actuation systems may be configured to be modified with minimal effort, and sensing systems may be provided where necessary due to the selection of general-purpose digital busses and the specification of standard messaging protocols. In addition, the controller may be configured to be programmed using a visual programming interface and standard input/output blocks.

The autonomous vehicle control board according to various embodiments may be a high performance, hard real-time capable processing board. The board may include a BeagleBone Black processor board connected to a custom h-bridge motor driver board. The BeagleBone Black board may be running custom, bare-metal firmware without any host operating system (e.g. without Linux, QNX, etc.). The custom driver board may include 5 or more high current h-bridge motor drivers, a PIC microcontroller, an FTDI USB to UART converter and some supporting circuitry.

In the following, design decisions made during the creation of the board, as well as the resulting system architecture and hardware architecture will be described. In the following, the controller design will be described.

Figure 2:
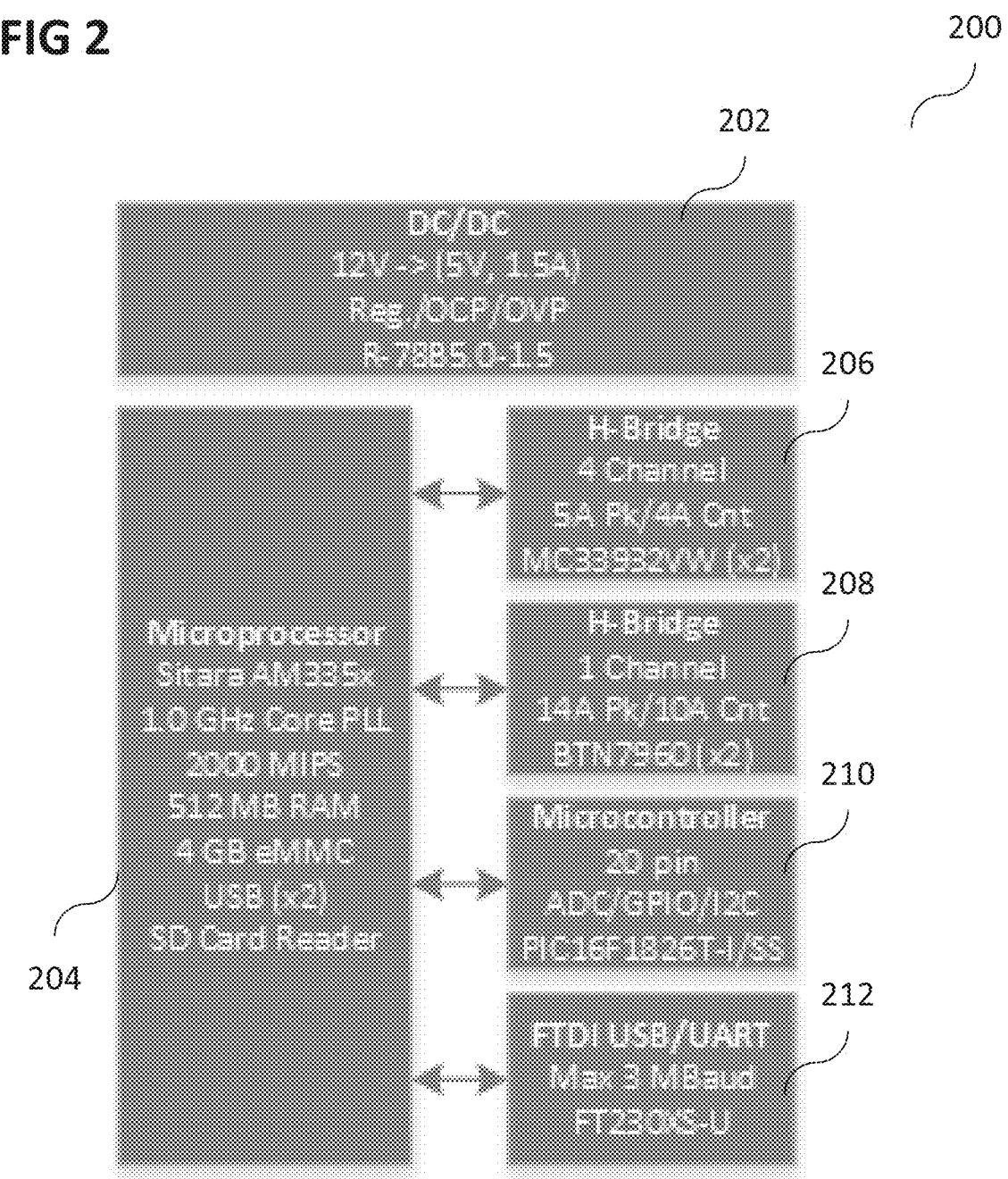
FIG. 2 shows an illustration of a control board architecture according to various embodiments.

FIG. 2 shows an illustration 200 of a control board architecture according to various embodiments with a power supply 202, a microprocessor 204, an H-bridge 206, a further H-bridge 208, a microcontroller 210, and a communication circuit 212.

Figure 3:
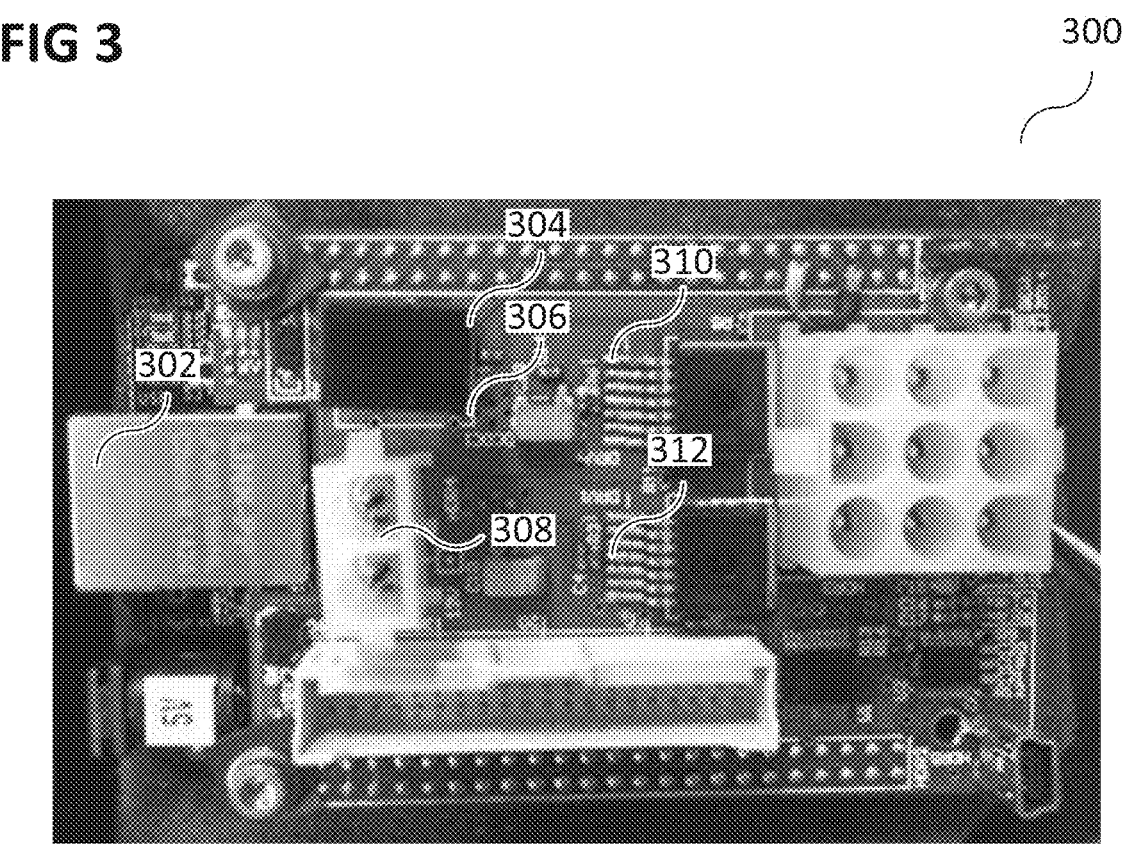
FIG. 3 shows a top down view of a general autonomy controller control board according to various embodiments.

FIG. 3 shows a top down view 300 of the GAC control board according to various embodiments, wherein a high current drive connectors, low-current interface header, motor driver ICs and supporting controllers are shown. A Beaglebone Black 302, H-bridges 304, 306, GPIO headers 308, H-bridge connectors 310, and a CAN interface 312 are shown.

It will be understood that the control boards shown in FIG. 2 and FIG. 3 may be configured as PCBs (printed circuit boards) which are a shield (in other words, which are designed to fit directly on top of another PCB). According to various embodiments, the control boards may be configured to mechanically interface directly with the beaglebone black.

The GAC processor board according to various embodiments may be an independent system capable of ensuring the safety of the vehicle at a low-level. The board provides achieves this with interfaces, with low level components in hard real-time and is for responsible for independently mitigating any component failures of failure modes of the vehicle. The system may be configured to receive and interpret high-level commands from a 'supervisory' controller (internal to the GAC system) which describe the desired motion of the vehicle at a high level. The low-level controller may then act to achieve this motion by actuating the various mechatronic components on the vehicle, accounting for any physical, thermal and temporal limits of the components.

In order to facilitate the timing requirements of an autonomous vehicle control system, a high performance processor board may be provided. This board, for example a BeagleBone Black, may include a TI (Texas Instruments) Sitara AM335x series microprocessor 204 with the core clock reaching up to 1 GHz. The board also provides 512 mb of DDR3 (double data rate 3) RAM (random access memory) and an SD (secure digital) card reader among other peripherals. The Sitara processor 204 may include a number of serial communication modules, GPIO (general purpose input/output) pins, a high-precision PWM (pulse width modulation) module, a NEON SIMD (Single Instruction, Multiple Data) floating point unit and an analogue to digital conversion module.

In order to perform computations with the highest level of determinism and to meet the strict timing requirements for a hard real-time simulation, no host operating system may be provided. Thus, all drivers may be custom written for bare metal deployment on the microprocessor. While this created a high barrier to entry and increased the development time for the board, it ensures the highest possible performance for the system and drastically increases its usefulness.

In the following, the control system architecture according to various embodiments will be described.

The GAC control system according to various embodiments may include two main controllers (for example the microprocessor 204 and the microcontroller 210). These controllers may include the custom Sitara based control board (to be referred to as the "control board") 204 and additionally one other controller 210 which acts in a supervisory role (to be referred to as the "supervisory controller"). The control board's role may be to interface with low-level sensors such as h-bridges 206, 208, linear actuator position potentiometers, wheel speed sensors, inertial measurement units etc. The control board may interface with these components using low level interfaces such as available GPIO pins, PWM, ADC (analog digital converter) and I2C serial modules.

The supervisory controller 210 may be responsible for the high-level processing of vision sensing input and any remote input from human operators. The supervisory controller's 210 role may be to issue a set of commands to the control board 204 to instruct it how to move the vehicle. The control board's 204 responsibility may be to interpret these commands, determine if they are feasible and actuator the motion of the vehicle necessary to achieve the desired motion.

In the event of a failure with any of the components, or if the control board detects that the vehicle is not able to meet the desired motion commanded by the supervisory controller, the control board may stop the motion of the vehicle in a safe and controlled manner and for informing the supervisory controller of its inability to meet the desired motion. The control board is thus the first level of response to any detected failure modes of the vehicle. Given the controller's low-level proximity to sensors and actuators it is thus best suited to respond to these failure modes since it has direct control over the necessary actuators.

According to various embodiments, there may be two main failure modes for the control board. Software failure resulting in processor lockup and electrical failure of the control board.

An on-board watchdog timer may be a primary means of detecting the first failure mode. If the processor has not cleared the watchdog timer counter value before it reaches a given value the device may enter a failure state, driving all I/O (input/output) pins to a user defined known state. This state which is to be determined by the application of the board may place the vehicle into a safe and controlled state.

The second failure mode may be more difficult to detect, however, preventative measures may be put into place for the design of the board. These measures may include detection and mitigation of short-circuit and under-voltage conditions for the main DC/DC supply. Capabilities may also be included to measure current for the h-bridge outputs on board. Each h-bridge channel module may also be equipped with an over-current, over-temperature and short-circuit protection feature. Failures at the DC/DC level may be met with the complete power down of the control board and thus all I/O pins being driven into a high-impedance state.

The primary communication channel between the control board and the supervisory controller may be user selectable between UART and SPI. There may be 2 UART channels exposed on the main low-current interface header along with one SPI channel. The user may determine which of the two serial protocols best meets the needs of the system. For the Autonomous bicycle application, UART may be provided, and it may provide a simple protocol to work with. At the software level a robust protocol may be defined and implemented to handle data integrity between the two devices.

The control architecture may also allow for two other controllers to be connected to the control board. These controllers may be connected via SPI and UART via the main low-current interface header. The primary use of these controllers may be to be for the inclusion of other vision sensors and sensors which require a separate controller for processing.

According to various embodiments, the controller may include standard interfaces to authentication and payment systems using RFID (radio frequency identification) and NFC (near field communication) technology, enabling both spontaneous on-the-spot bookings of autonomous vehicles as well as authentication of pre-reserved vehicles integrated with GACs. The system may make use of a white-list, enabling passengers to use the systems even in circumstances of temporary lack of network connectivity.

According to various embodiments, are several approaches may be provided to ruggedize the sensor and critical vehicle control systems. The first level of protection from both accidental as well as intentional damage may be afforded by selecting the cheapest possible components capable of meeting the minimum performance requirements (resolution, field of vision, data acquisition frequency etc.) and encasing them in vibration, weather, and environmentally isolated housings affixed to the vehicle. Secondly, data on vehicle use (and abuse) may be recorded, and incidents of misuse may be automatically flagged for follow up. Should damage be detected upon inspection, the responsible user should be easy to identify. Finally, to guard against wanton vandalism, camera systems may be used to capture as much of the surrounding environment as possible, including redundant rear and side-facing cameras which may serve the dual-purpose of building localization and mapping databases as well as helping identify vandals.

The GAC may be validated through rigorous on-road testing in a closed-circuit track. The full validation may be expected to require several hundreds of kilometers of real-world on-road driving, which, when considering charging times, may take up to a full month to obtain. It may also be important to experience sufficient rain and inclement weather events to ensure that the weatherproofing functions adequately. Stress and vandalism testing may be performed on a formal basis to ensure that all closures are tamperproof, electrical systems withstand the shock of falling and dropping, and camera systems survive expected impacts. International standards for electric vehicle systems are followed in all cases.

In the following, autonomy and control according to various embodiments will be described.

The challenge of simultaneously localizing a vehicle and mapping an environment is almost as old as the field of robotics. Modern SLAM (simultaneous localization and mapping) techniques rely heavily on LiDAR (light radar) systems to measure the distance to all objects in a given field of view. This industry standard for autonomous vehicles has evolved from using infra-red or sonar distance measurements which are both susceptible to various interferences rendering their signal to noise ratio unacceptably high, and are used in competing systems to localize. A new series of methods for feature detection (e.g. scale-invariant feature transform SIFT), and for calculating displacement from optical flow based on e.g. Lucas-Kanade for affine flow field models have enabled researchers to perform SLAM based on visual data only. This approach may be provided for the GAC technology, as it dramatically reduces SLAM system cost while maintaining functionality under specific conditions by replacing expensive sensors with commodity cameras and making up for the lack of sensor precision with complexity of analysis algorithm. The overall system architecture is shown in course resolution in FIG. 4.

Figure 4:
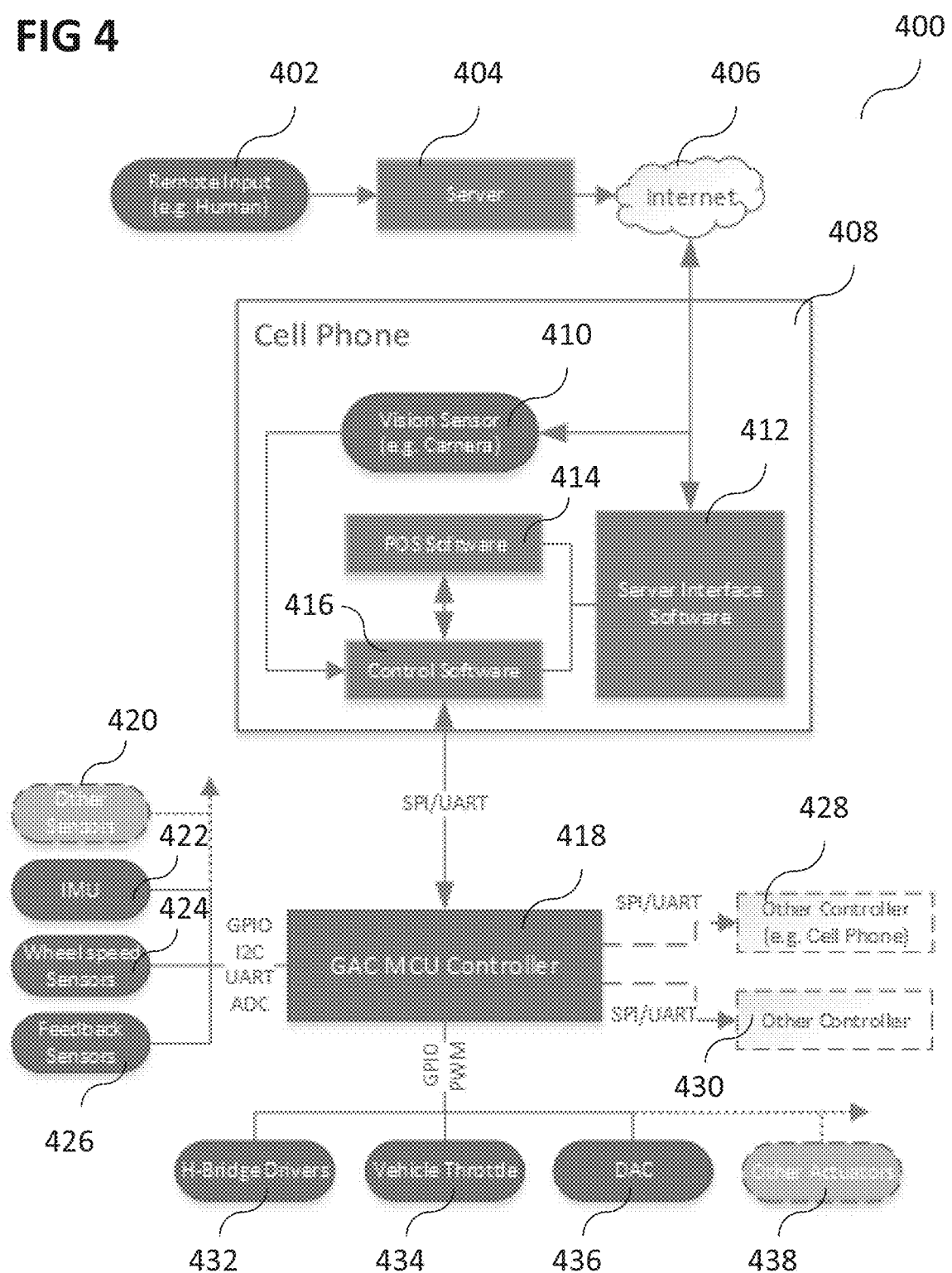
FIG. 4 shows an illustration of an overall system architecture according to various embodiments.

FIG. 4 shows an illustration 400 of an overall system architecture according to various embodiments, showing an arbitrary vehicle's autonomy system (in other words, FIG. 4 shows custom low-level control interactions with an overall control system according to various embodiments). Remote input 402 (for example provided by a human) may be provided to a server 404, which may communicate with a computing system 408 (for example a cell phone) via the internet 406. The computing system 408 may include a vision sensor 410, a server interface software 412, a pos (point of sale) software 414, and a control software 416. The computing system 408 may communicate with the GAC MCU (micro controller unit) controller 418 using SPI/UART. The GAC MCU controller 418 may communicate with other controllers 428, 430 (for example another cell phone) using SPI/UART. The GAC MCU controller 418 may communicate with feedback sensors 426, wheel speed sensors 424, IMU 422, and other sensors 420 using GPIO/

I2C/UART/ADC. The GAC MCU controller 418 may communicate with h-bridge drivers 432, vehicle throttle 434, DAC (digital analog converter) 436, and other actuators 438 using GPIO/PWM.

Various methods according to various embodiments may be implemented on the GAC and may be based on visual SLAM and sensor fusion. They place object and safe operating envelope detection and avoidance in a high-priority high-speed loop, whereas communication and global path planning tasks are placed at a lower priority. Mid-level tasks such as evaluating when to actuate mechanisms, or setting optimal speed and steering programs (in non-safety critical scenarios) may be performed as soon as resources from the high-priority tasks become available. The control logic provided for the GAC, while appearing linear, may include many cross-dependencies between methods which were omitted for simplicity. For example, the optical flow speed estimate may also be used to augment wheel and IMU speed estimations for dead-reckoning localization, which is in turn used to check the output of the SLAM method. The complexity of the control may be managed by following the standard vehicle control development V-cycle, and by testing functions off-line in a software environment before they are loaded to the production controller.

The SLAM system according to various embodiments may be configured to capture and store video capture information on a remote, centralized server. This data may be analyzed, and features may be matched between vehicles travelling on the same route. This may be scalable, so that as the fleet grows, information about the service area may improve and hence increase system safety, reliability, and efficiency.

Figure 5:
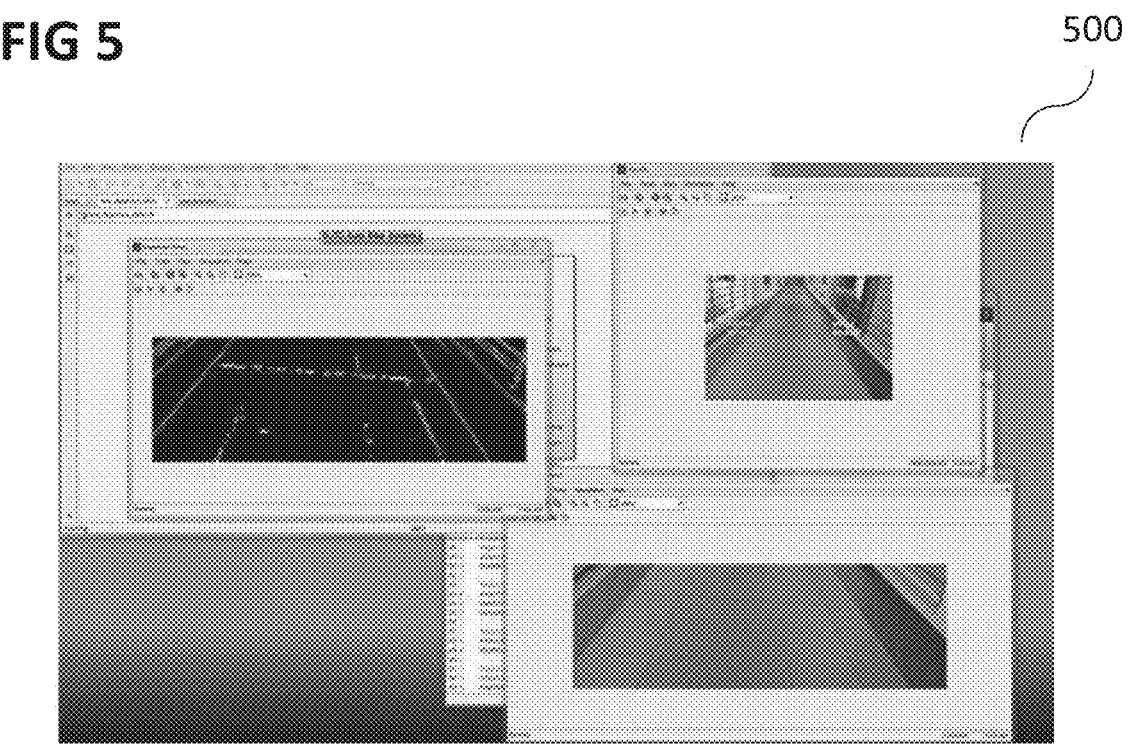
FIG. 5 shows an illustration of a proof-of-concept vSLAM (visual simultaneous localization and mapping) code according to various embodiments in operation.

FIG. 5 shows an illustration 500 of a proof-of-concept vSLAM code according to various embodiments in operation.

For the edge, corner, and feature detection provided in the visual SLAM method, a system of depositing invisible ink in the environment during runs where human operators are driving the vehicles may be integrated with the GAC. The system may enable 'trusted routes' to be established, and may be automatically refreshed by self-driving vehicles without human control. According to various embodiments, ink which phosphoresces under ultraviolet light but is invisible under irradiation in the visible spectrum may be used. The UV lamps may reside in a small hutch where a second camera system enables lines, shapes, and text printed in UV-reactive ink by the air-brush to be recognized and used to augment the localization systems.

In the following, GAC system management according to various embodiments will be described.

According to various embodiments, the autonomous vehicle technology enabled by the GAC may provide demand matching for shared mobility.

There are many schemes worldwide which offer users 'point A to point A' shared mobility. These systems do not suffer from rebalancing issues since the rented shared vehicle is returned to the same place it was rented from. These systems are not, however, able to react to fundamental demand patters such as the tendency for people to move from the suburbs to the city in the morning, and the city to the suburbs in the afternoon. Other systems offer 'point A to point B' shared mobility rental schemes, in which a user may take any vehicle from point A, and return it to point B. This works for cars as well as for cycles. The fundamental challenge that operators of 'A to B' systems have is that they need to handle fleet-rebalancing throughout their daily operation cycle to ensure that enough vehicles are waiting at the areas 'A' of high demand. In essence, these operators incur significant costs in moving vehicles from 'B' back to 'A'.

According to various embodiments, fleet redistribution according to various embodiments may provide various aspects: 1) Methods for predicting demand based not only on historical rental patterns but also on publicly available transportation system information; 2) Methods for optimal fleet distribution strategies based on the demand predictions and real-time supply, 3) Methods for understanding how price signals can be incorporated into mobility on demand systems to enable an 'A to B' system to function without redistribution costs. According to various embodiments, both the point to point mobility problem, as well as the fleet redistribution problem may be solved.

Various embodiments may address each of the system management sub-problems, and data management processes may be provided which enable efficient processing, visualization, and analysis of both time-series and GIS (geographic information system) data. To accomplish this, a standard for data transmission and storage may be provided, leveraging and expanding autonomous vehicle standards. Data links to public information may be created which are robust to format changes, and which are able to serve status, alerts, and service disruption information in near-real time. Historical data generated by mobility on demand systems during bicycle rental activities may be used to calibrate initial models, which may provide an excellent starting point for designing the experiments to populate better demand models. Operations research optimization approaches may be modified and expanded to incorporate fleets which may redistribute themselves.

According to various embodiments, the GAC system management may include a telematics system. The telematics system may be configured to provide messaging and data transfer service for the autonomous controller package. Components within the telematics system are illustrated in FIG. 6.

Figure 6:
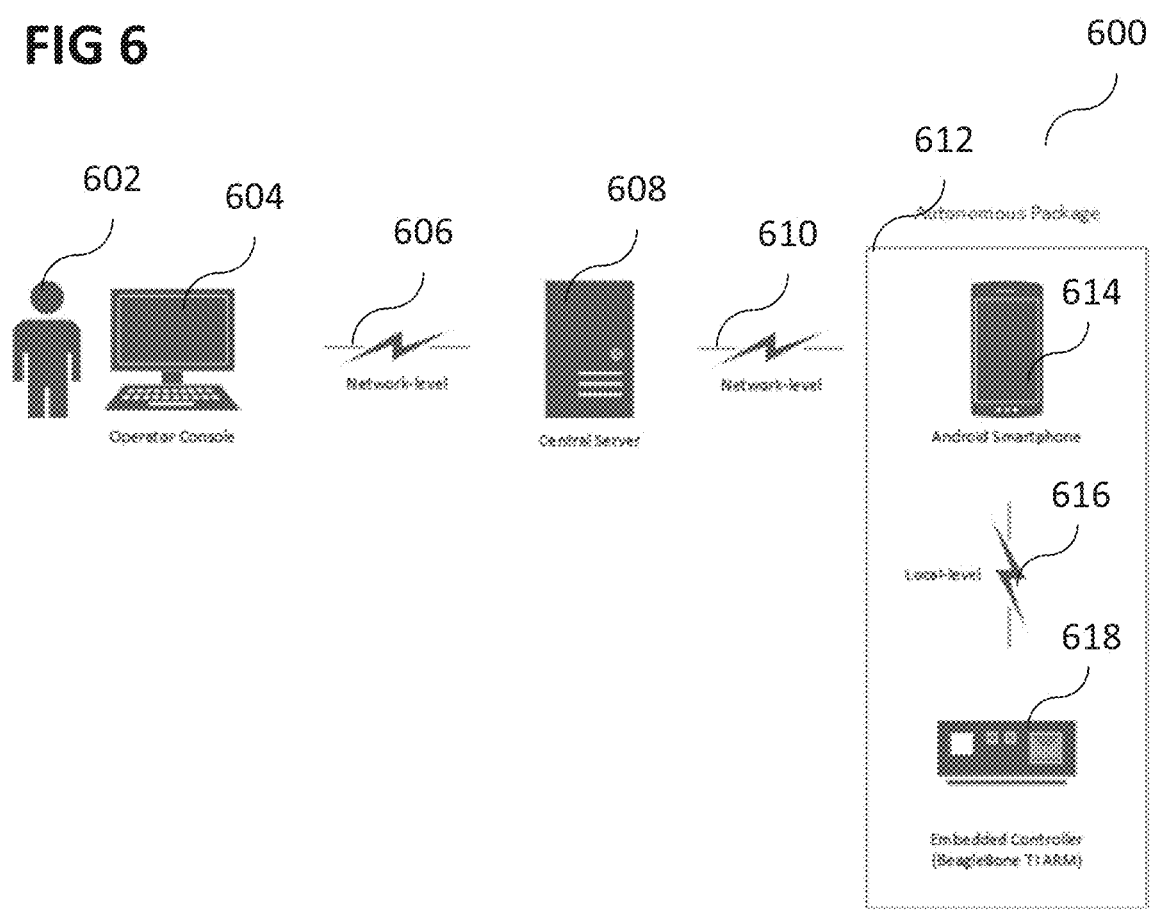
FIG. 6 shows an overview of a telematics system according to various embodiments.

FIG. 6 shows an overview 600 of a telematics system according to various embodiments. An operator 602 may use an operator console 604, which may communicate with a server 608 (which may be referred to as central server) on a network level (for example via the internet), like indicated by arrow 606. The central server 608 may communicate with an autonomous package 612 on a network level (for example via the internet), like indicated by arrow 610. The autonomous package 612 may include a computing device 614 (for example a mobile phone, for example a smart phone, for example an Android smart phone), which may communicate on a local level (for example using Bluetooth or wireless local area network (WLAN) communication, or for example a wired connection, for example USB (universal serial bus)), like indicated by arrow 616, with an embedded controller 618, for example a BeagleBone TI ARM, for example like illustrated in FIG. 4.

According to various embodiments, the network-level interface (for example like indicated by arrows 606 and 610 in FIG. 6) may transmit AV (audio/video) and data with low-latency over the IP (internet protocol) network. There may be three components connected:

1. The computing device 614 (for example an Android smart phone), which may be a gateway between network and local interfaces;

2. The operator console 604 (which may be referred to as console, and which may be a remote control operator console) may be configured to send commands and receive an AV feed from the autonomous package 612, and may for example be powered by web technologies such as HyperText Markup Language (HTML) 5 and JavaScript (JS);

3. The server 608 may be a common node or meeting point for the two components above (the console 604 and the computing device 614), and may be configured to serve content to the console 604, log vehicle data and AV streams, and monitor the status of both the Android 614 and console 604.

The local-level interface, like illustrated by arrow 616, may band together (in other words: may connect) the Android 614 and the ARM-based Embedded Controller 618. According to various embodiments, this interface may connect custom hardware, and all OSI (Open Systems Interconnection) layers may be provided. It is to be noted that communications internal to the Embedded Controller 618 (e.g. between the ARM processor on BeagleBone and PIC controller on the custom PCB) may not form a part of the local-level telematics interface.

The local-level interface may be used for communication within the autonomous package, specifically between Android 614 and BeagleBone Embedded Controller 618. A USB serial connection may serve as the physical link. A serial communication protocol may be provided for interconnectivity between the two components. The messaging protocol may define a message frame with includes CRC (cyclic redundancy check) checksum, command identifier (ID), and payload. By transmitting metadata such as payload length and CRC checksum along with the message payload, the integrity of the interface may be improved. The protocol may be flexible in that it allows for a high number of custom messages to be defined. It may also carry a relatively large (for example a few kilobytes) payload. Appropriate message IDs (identifiers) may be provided for the Smartphone (for example Android) 614 and embedded controller 618 to interface with each other.

Various embodiments may be provided in various platforms, and different platforms may address different aspects.

Figure 7:
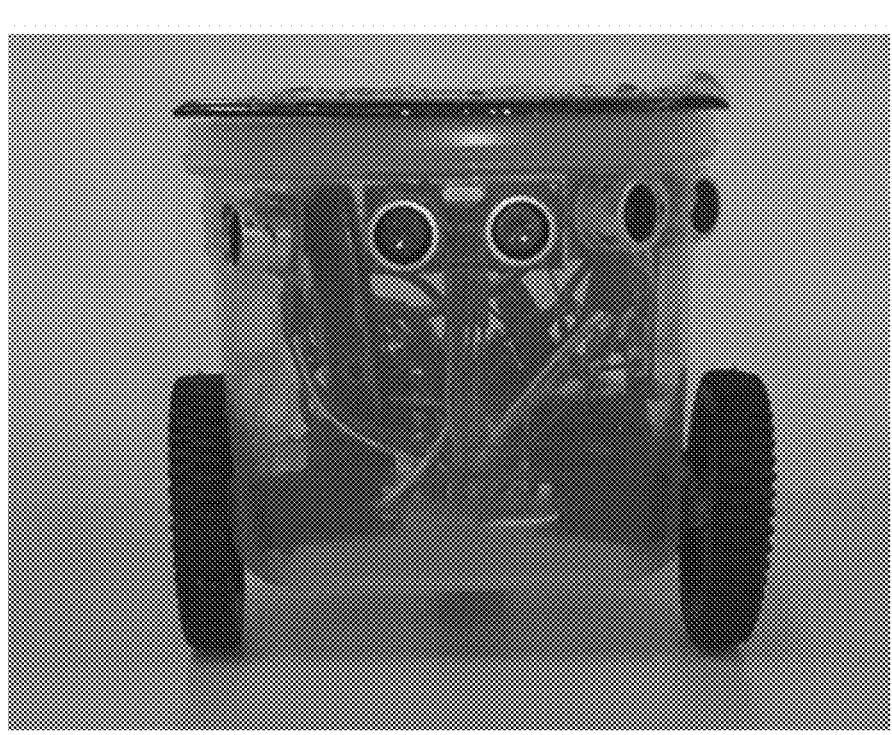
FIG. 7 shows a photograph of a robotic system according to various embodiments.

FIG. 7 shows a photograph 700 of a robotic system according to various embodiments.

Figure 8:
FIG. 8 shows a photograph of a self-driving bicycle according to various embodiments.

FIG. 8 shows a photograph 800 of a self-driving bicycle according to various embodiments.

According to various embodiments, autonomous electric bicycles, which may be referred to as AutoBikes, and which may be provided for first and last-mile mobility on demand, may be provided.

Despite significant interest and large-scale deployment in major cities worldwide, urban bicycle sharing systems suffer from significant drawbacks resulting in a reduction in overall impact. Foremost among these problems are the difficulties presented in re-balancing the bicycle fleets to optimally serve demand with bicycle supply in real-time, the cost and footprint of sharing station infrastructure, as well as the substantial costs of damage and theft. The AutoBike technology platform according to various embodiments may solve rebalancing, damage, kiosk space, and real-time demand management problems by enabling bicycles to cruise autonomously while rider-less, and provide route guidance and rider monitoring while ridden. The AutoBikes may be configured to be self-driving when not being ridden, removing the need for traditional rental kiosks thereby saving significant infrastructure and land rental costs. The AutoBikes may recognize road boundaries and avoid collision with both static and dynamic obstacles. They can be automatically rented via RFID cards either on-the-fly, or via pre-booking on a smartphone, and are only marginally more expensive than standard electric bicycles. Mechanical, electrical, and control architectures may be provided for the AutoBike according to various embodiments. According to various embodiments, vision-only autonomous vehicle control may be provided in both dynamic and static environments through statistical machine learning approaches.

In order to meet the travel demands of a growing urban population, particularly in first and last mile scenarios, large cities are increasingly promoting alternatives to personal cars, and often these involve cycling. Bicycle sharing systems have been introduced in various forms in over 700 cities around the world, with implementations ranging from free, uncontrolled community bikes to technologically advanced, secure systems. The features common to most successful systems are: Dense vehicle deployment over 10-15 km2 (300 m average between stations), fully automated locking systems, vehicle tracking using wireless and RFID technologies, real time fleet monitoring, real time user interfaces through web, mobile phone and/or on site terminals, pricing structure incentivizing short trips maximizing the number of trips.

A survey conducted in a largest bike sharing systems indicated two major frustrations for users of commonly used systems are: (a) the difficulty to find an available bike when users want to start their journey and (b) the difficulty to find an empty drop off location for the bike.

According to various embodiments, stability and steering methods for a bicycle, its low level as well as supervisory, vision, and human-in-the-loop control systems, and the methods used for leaving invisible signals for autonomy may be provided. According to various embodiments, autonomous rebalancing of fleets may be provided.

In the following, mechanical systems according to various embodiments will be described.

According to various embodiments, a bicycle which is stable in all operating modes, and which is controllable may be provided. Various strategies for achieving stability for bicycles may be based on gyroscopes or inverted pendulums.

Figure 9A:
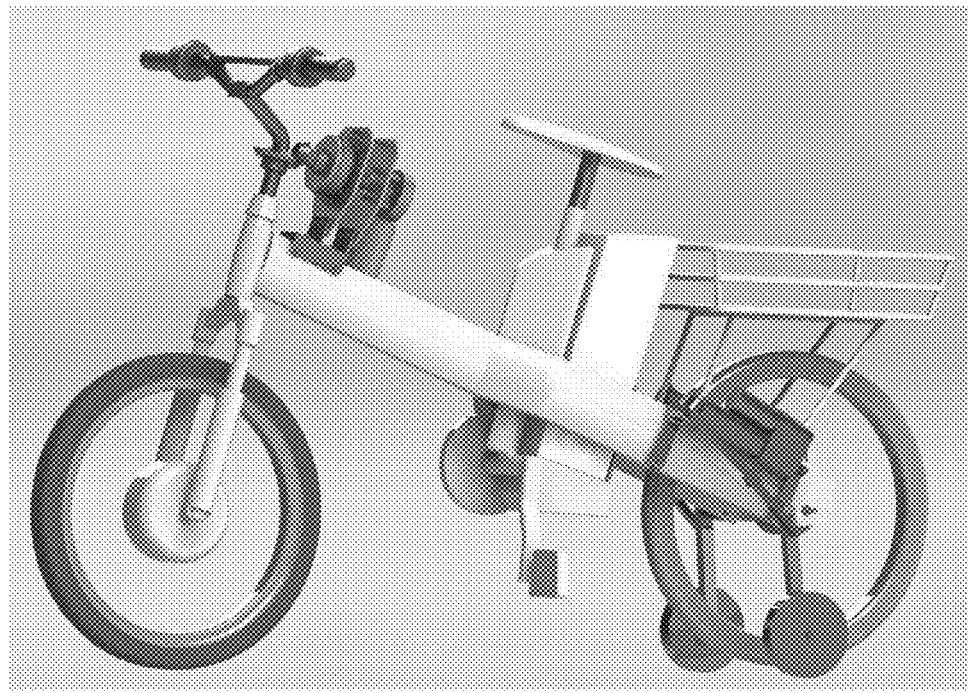
FIG. 9A shows a CAD (computer aided design) model of an Auto-bike with steering and wheel retraction assemblies according to various embodiments.
Figure 9B:
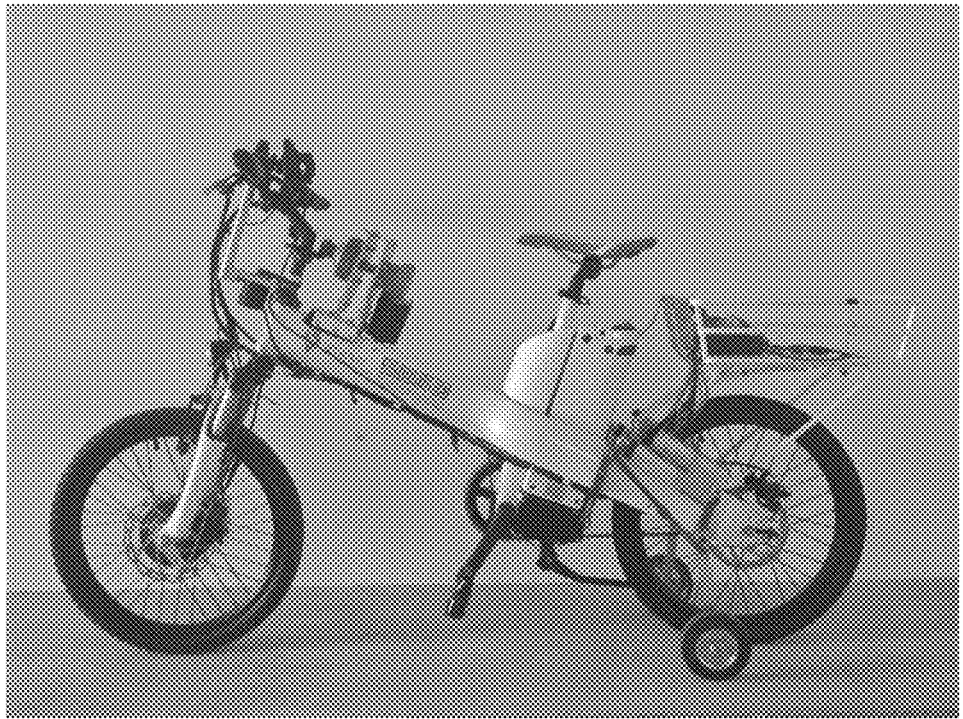
FIG. 9B shows a physical embodiment of an autonomous bicycle according to various embodiments.

According to various embodiments, separate balancing and steering control functions and implement retractable balancing wheels for stability at lower speeds and electrically driven steering column as shown in FIG. 9A and FIG. 9B may be provided.

FIG. 9A shows a CAD (computer aided design) model 900 of an Auto-bike with steering and wheel retraction assemblies according to various embodiments.

FIG. 9B shows a physical embodiment of an autonomous bicycle 902 according to various embodiments.

According to various embodiments, self-stability control above a threshold velocity may be provided with retracted wheels, for example by provided a controller based on an understanding of the gyroscopic and caster effects in the dynamical system.

In the following, propulsion and braking according to various embodiments will be described.

The bicycle according to various embodiments may be driven by a 250 W brushless DC motor on its front wheel with a maximum speed of roughly 25 km/h with a 20-inch (0.508 m) diameter tire. The maximum speed during autonomous operation, however, is limited to 4-5 km/h depending on road grade.

Braking while in autonomous mode may be achieved using a cantilever braking system distinct from the bicycles' primary disc braking system. An electric linear actuator which can supply a peak force of 23 N is used to operate the brake. The vehicle's stopping ability from its maximum velocity of 4-5 km/h was tested, and the brake was able to achieve a complete stop with a deceleration of 0.09 g on planar surfaces.

In the following, steering according to various embodiments will be described.

The torque required to steer the unmanned bike according to various embodiments at standstill was measured to be 6.2 N-m at the steering column. According to various embodiments, a 12 V, 20 W bipolar stepper motor with chain and sprocket transmission having a torque multiplication factor of 3.6 may be provided. According to various embodiments, a clutch may be provided in order to enhance manual steering by releasing the rigid coupling between the motor and the shaft.

Figure 10:
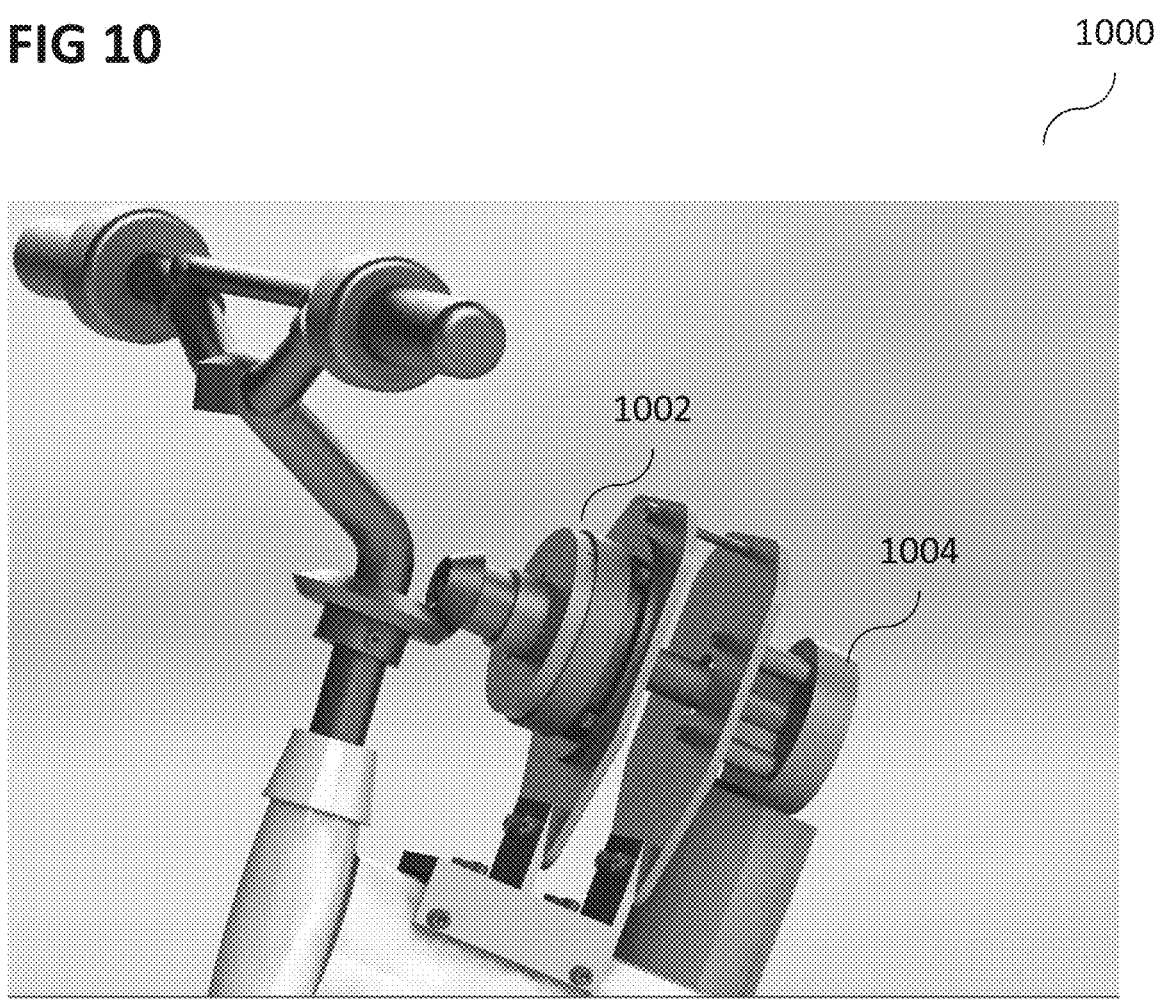
FIG. 10 shows an illustration of an Auto-bike steering assembly according to various embodiments.

FIG. 10 shows an illustration 1000 of an Auto-bike steering assembly according to various embodiments, including an electromagnetic (EM) clutch 1002 with a bevel gear train (2:1 speed ratio) in place of the chain to make it more compact. The motor 1004 may be a 12V DC, 60 W worm gear motor, which has a rated speed of 50 rpm and torque of 11.5 N-m.

With this configuration, the achievable steering accuracy may be 12 degrees, resulting in acceptable controllability. Teeth may be added to the gear to improve this performance. A steering speed of 30 degree/s may be optimal for most real-world driving scenarios. The EM clutch 1002 may also add the flexibility of instantaneous engaging/disengaging, which may be useful when experimenting with freewheeling at high speeds.

In the following, wheel retraction according to various embodiments will be described.

According to various embodiments, balancing wheels may be provided and may be configured to absorb dynamic loads expected during acceleration, braking or traversing obstacles. A triangulated member may be apt for the former while being weaker during tangential loading. The wheels may be quickly deployed should the vehicle's speed be suddenly reduced.

To satisfy these constraints, a reverse sliding crank mechanism with a linear actuator may be provided.

According to various embodiments, a modified version of an aircraft landing gear mechanism may be provided which compartmentalizes the loading on the wheel and the actuator. A 110 lbs (489 N) max force actuator with 2-inch (0.0508 m) stroke may be provided. A bell-crank connected to the actuator may achieve total wheel lift within this short stroke and a pivoted connection between this lever and the wheel holding frame ensures locking when wheels are down.

Figure 11A:
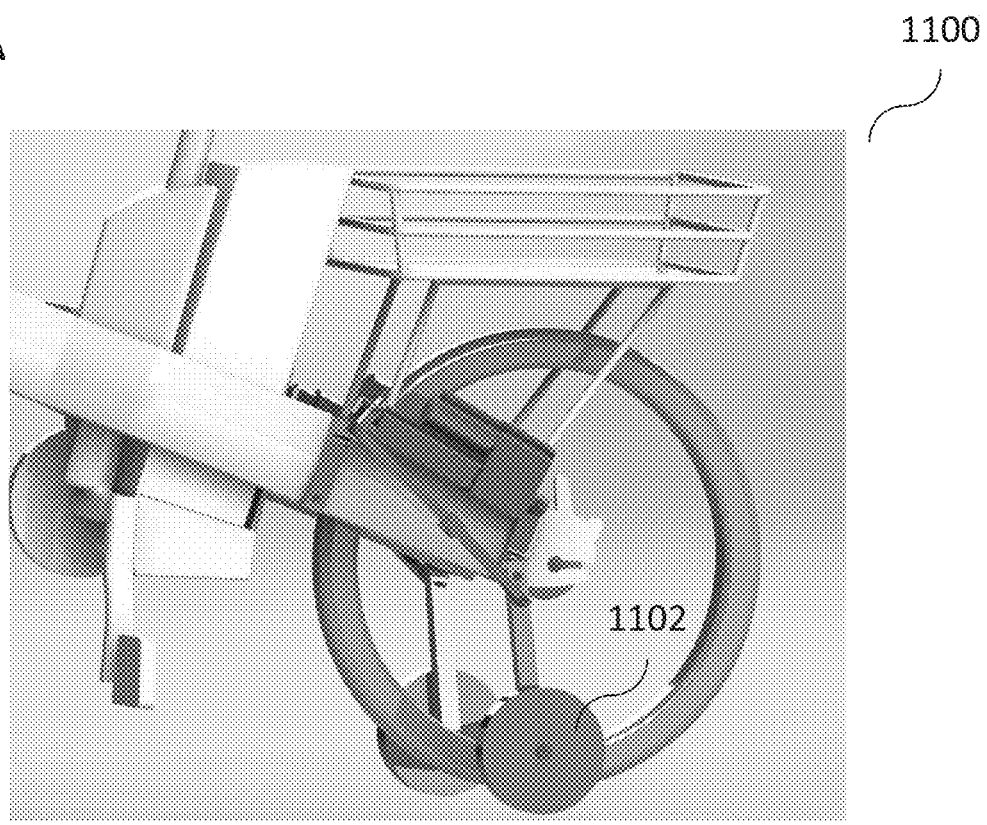
FIG. 11A shows an illustration of a bicycle according to various embodiments when the balancing wheels are (for example fully) extended.

FIG. 11A shows an illustration 1100 of a bicycle according to various embodiments when the balancing wheels 1102 are (for example fully) extended.

Figure 11B:
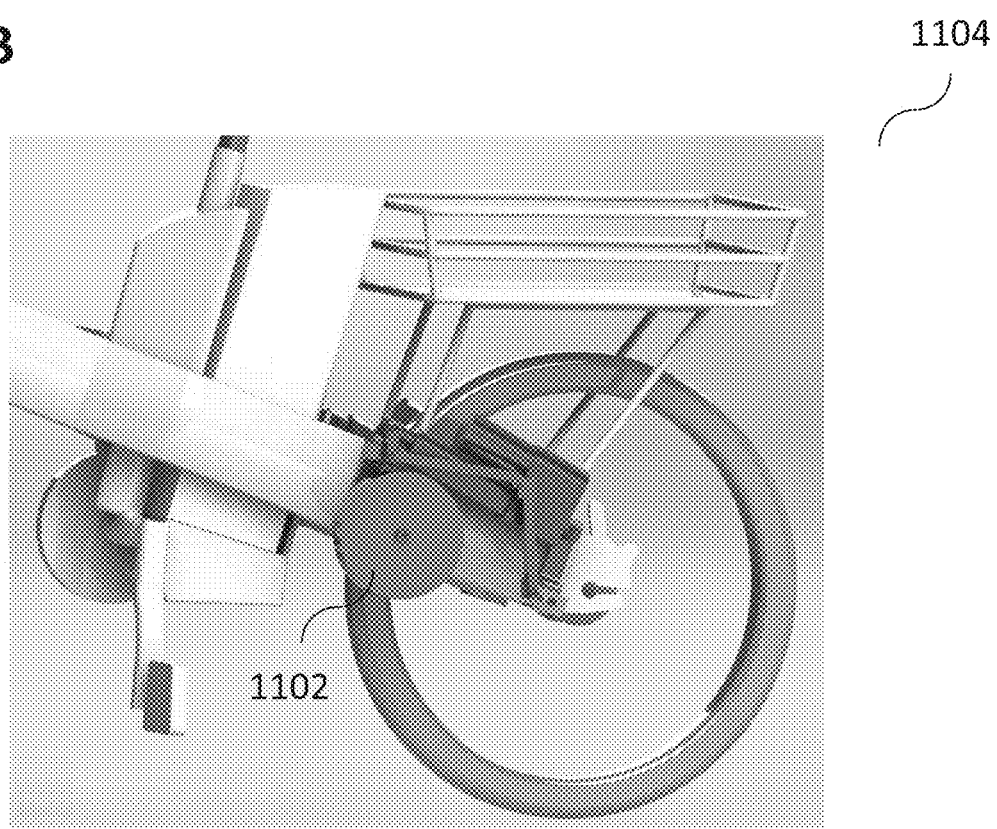
FIG. 11B shows an illustration of a bicycle according to various embodiments when the balancing wheels are (for example fully) retracted.

FIG. 11B shows an illustration 1104 of a bicycle according to various embodiments when the balancing wheels 1102 are (for example fully) retracted.

In the following, further to what has been described above, more details to the electrical and control systems according to various embodiments will be described.

According to various embodiments, the bicycle's control system may include two main embedded systems communicating with one another using a UART serial link. A Beaglebone Black microcontroller connected to a custom motor driver board may provide for low-level control of the bicycles dynamic behavior. For example, this controller may receive a speed and heading input, and may ensure that the vehicle responds appropriately.

The second controller may be considered a supervisory controller, and may include a mobile phone running the Android OS with a custom application software that is responsible for maintaining a connection to a web server, GPS route planning, computer vision processing and dynamic model calculations. For example, the supervisory controller may receive a set of waypoints from the dispatch web server, and may translate these into speed and heading commands to travel this route.

The low-level control board may interpret commands from the Android phone in order to actuate various components of the electrical system that allow the bike to move. It may also be configured to relay sensor feedback to the phone and maintain safe operating conditions for the bike by mitigating failure conditions.

Figure 12:
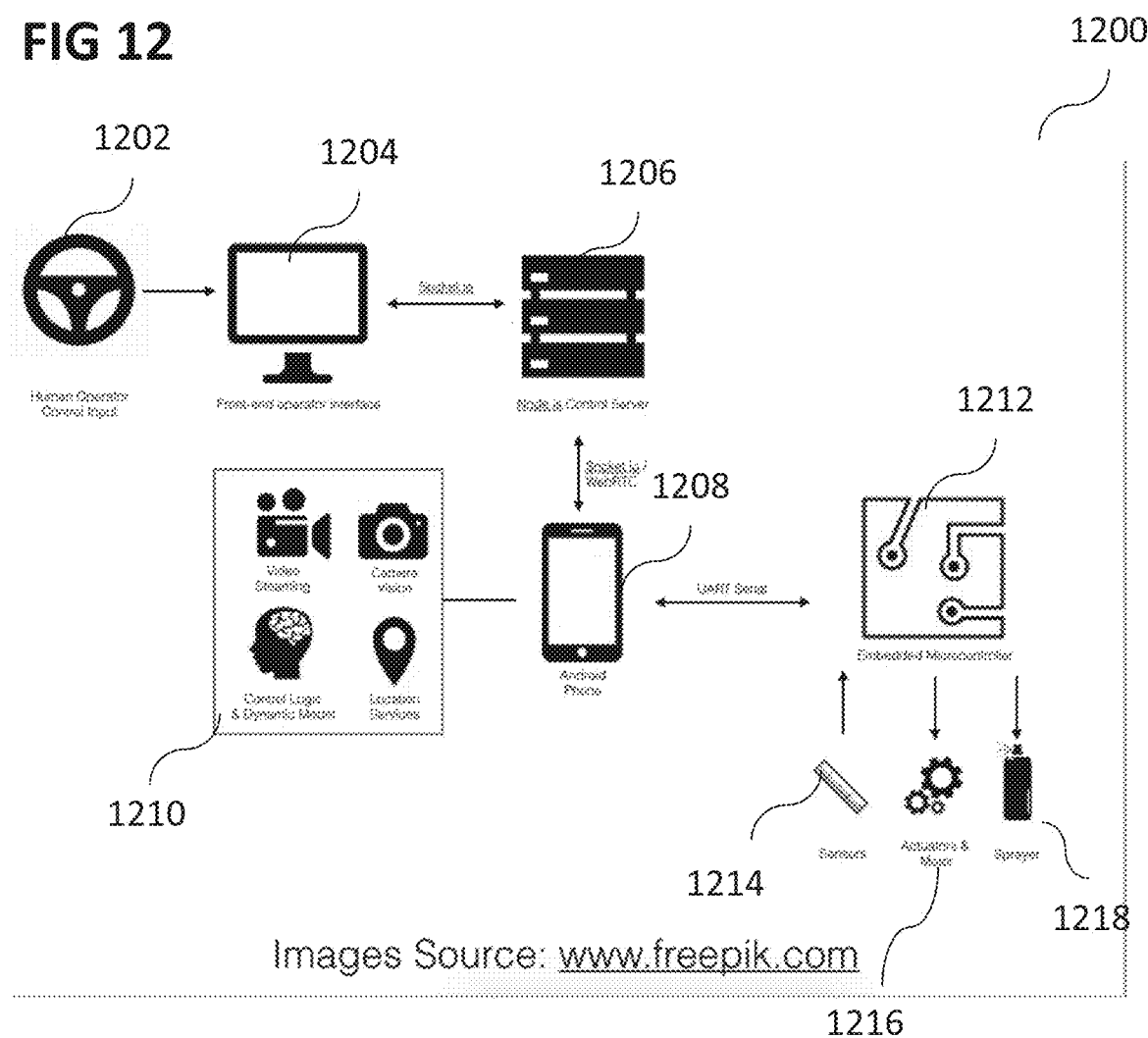
FIG. 12 shows an illustration of a control architecture according to various embodiments.

FIG. 12 shows an illustration 1200 of a control architecture according to various embodiments. Control input from a human operator 1202 may be provided to a front-end operator interface 1204. Via a socket input/output, the front-end operator interface 1204 may communication with a node, which may be a control server 1206. The control server 1206 may communicate with an Android phone 128, which may provide video streaming, camera vision, control logic and dynamic model, and location services (like indicated by box 1202). The Android phone 1208 may communicate with an embedded microcontroller 1212, which may include sensors 1214, actuators 1216 (for example a motor), and a sprayer 1218, like will be described in more detail below. The control components shown in FIG. 12 will be described in more detail in the following.

In the following, electrical systems according to various embodiments will be described.

According to various embodiments, a custom driver board (for example like shown in FIG. 2 and FIG. 3) may be provided which may facilitate the power electronic components on the bicycle. The board may include 5 full H-bridge channels, an on-board microcontroller and a USB to UART interface IC. The control board may switch currents up to 10 A.

According to various embodiments, a low-level control system may be configured to provide safety critical, real-time sensing and actuation of the bicycle's low-level mechatronic components. These components may include linear actuators, and DC (direct current) motors. Sensors may include linear actuator position sensors, wheel speed sensors, steering angle encoder, and a 9-axis inertial measurement unit. The low-level embedded controller may be configured to interface with a custom power electronics board which in turn directly drives the DC steering motor, and provides a signal for the bicycle drive motor and linear actuators.

In the following, a custom controller according to various embodiments will be described.

According to various embodiments, the main controller may include a TI AM335x series processor packaged in the BeagleBone Black. A comprehensive set of custom drivers were written to interface directly with the low-level processor meaning no operating system is employed. This may give exclusive access to all hardware resources available to the processor, most notably the NEON hardware floating point accelerator. Direct processor resource access may be provided to increase the level of determinism of the system and to more easily meet the model time constraints. The software on the low-level controller may execute in hard real-time at a rate of 1 kHz.

For mobility on demand applications, the boot time of the system is a key consumer acceptability factor. Running a 'bare-metal' controller (i.e. without a dedicated operating system) according to various embodiments allows for boot times of well under 2 seconds from power-on to full functionality.

Given the high reliance of automatically generated code found throughout the automotive industry, bindings may be created to allow the low-level controller code to be authored in MATLAB and Simulink. This also allows the controller to be easily re-used to target other applications, and drastically increases the ease of use for implementations on this controller. The interactions between the low-level controller and the other control systems are shown in FIG. 4.

According to various embodiments, at each of the 1 kHz software "steps", the current value of each on-board sensor may be read into memory by the C++ drivers. The compiled Simulink model code may then be advanced one discrete simulation step, and the sensor values may be accessed in order to determine appropriate actions. Additionally, one command may be read from the UART serial interface. Depending on the nature of the command, appropriate actions may be triggered by the model. For example, a remote-control command may request a certain steering angle, and the model may determine the appropriate direction to turn the steering motor depending on how its currently sensed position relates to the requested angle.

The model may also issue one or more UART response messages to the supervisory controller at each step. These may include a confirmation of entering autonomous mode, indication of a low-level problem such as a non-fatal electrical failure, or state updates that notify the supervisor of the current readings from each sensor.

Despite these sensor updates, the overall control system may operate using a feed-forward model. This means that the supervisory controller (for example the Android phone) may issue control commands based on its current understanding of the situation. Computer vision, GPS-fused location, and learned behavior may be the main factors that influence this decision. The phone may not use the sensor values as part of its understanding. In this way, the low-level controller may be trusted to enact the phone's requested behavior based on its current understanding of the state of its sensors and the physical characteristics of the actuation system it is driving.

By avoiding the need for up-to-date sensor feedback on the supervisor controller, possible saturation of the UART communication link may be avoided. Additionally, timing issues caused by delays in sending the latest sensor values to the phone may not need to be considered. Various embodiments may also allow the supervisory controller to more easily be used in a different vehicle system with the same UART interface, because the exact physical nature of the vehicle may be kept separate from the high-level control logic.

In the following, autonomous control systems according to various embodiments will be described.

The AutoBike autonomous control system according to various embodiments may be managed by the Android device attached in front of the handlebars on the bike, which is an exemplary embodiment for (and acts as the) supervisory controller. This system may be responsible for the communication between the web server and bike controller and performs autonomous route planning based on server waypoints and computer vision inputs. A data communications link may be maintained with the external server through the use of asynchronous Socket.io operations, and may enable a remote operator to issue commands to the bike from a front-end web interface. These may include teleoperation commands, or signals to switch between autonomous and teleoperation modes. The link may also allow the server to be kept up-to-date on the bike's current position and state, information which can be relayed to the human operator.

The status of the UART communication link between the phone and embedded controller may be monitored by both parties. A periodic health check may be sent back and forth to indicate continuing operation. If this check is disrupted for any reason, the embedded controller may (for example immediately) enter a safe failure mode wherein the bike will be navigated to an immobile, safe state, while the phone may notify the server and human operator of the failure and attempt to re-establish contact.

The route planning according to various embodiments may be a mix of several components which provide a lightweight and effective system. These may include a vision system, GPS localization fused with sensor inputs, and learned responses derived from the algorithm observing human operator behavior. High level route planning may be performed on the server using GPS data and a waypoint system utilizing spline interpolation between the GPS waypoints. Additional information may be desired for driving as the GPS location data returned by the Android device is unable to provide a sufficiently accurate position. This data may come from the vision system, pre-recorded human teleoperation ("learned behavior"), and filtered dead-reckoning using dynamic model simulation.

In the following, a vision system according to various embodiments will be described.

According to various embodiments, the autonomous control system may primarily be managed by a vision system running on the Android device. The vision system may be tasked with determining a safe operating envelope (SOE) for the bike which describes the areas which the bike can travel. Utilizing the camera from the Android device and performing image processing techniques, it may be possible to identify the path and potential obstacles in front of the bike. Machine learning methods may be provided in order to navigate roads and paths. The SOE determination may be limited as the Android device only has one camera, which leads to only a small SOE which can be determined limited by the field of view of the camera. Two steps of the process are shown in FIG. 13A and FIG. 13B.

Figure 13A:
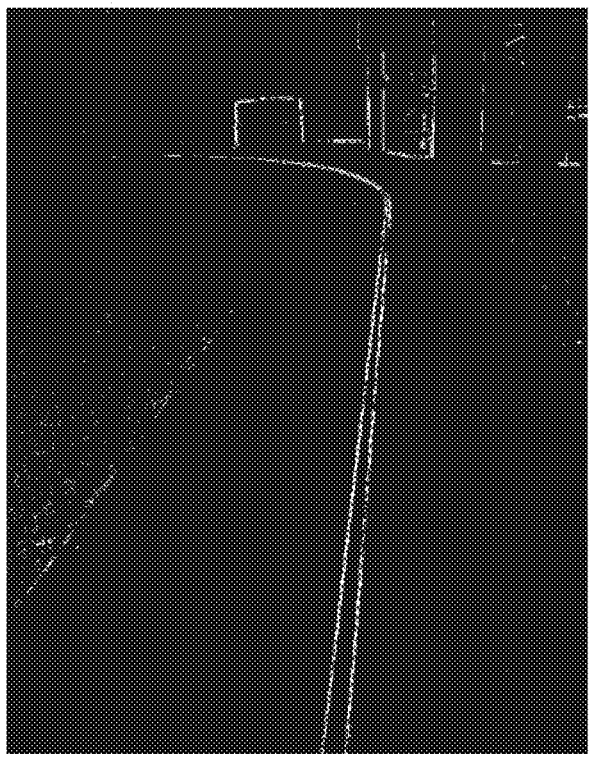
FIG. 13A shows an illustration of a video frame after edge detection according to various embodiments.

FIG. 13A shows an illustration 1300 of a video frame after edge detection according to various embodiments.

Figure 13B:
FIG. 13B shows an illustration of a video frame after Hough line detection according to various embodiments.

FIG. 13B shows an illustration 1302 of a video frame after Hough line detection according to various embodiments.

Figure 13C:
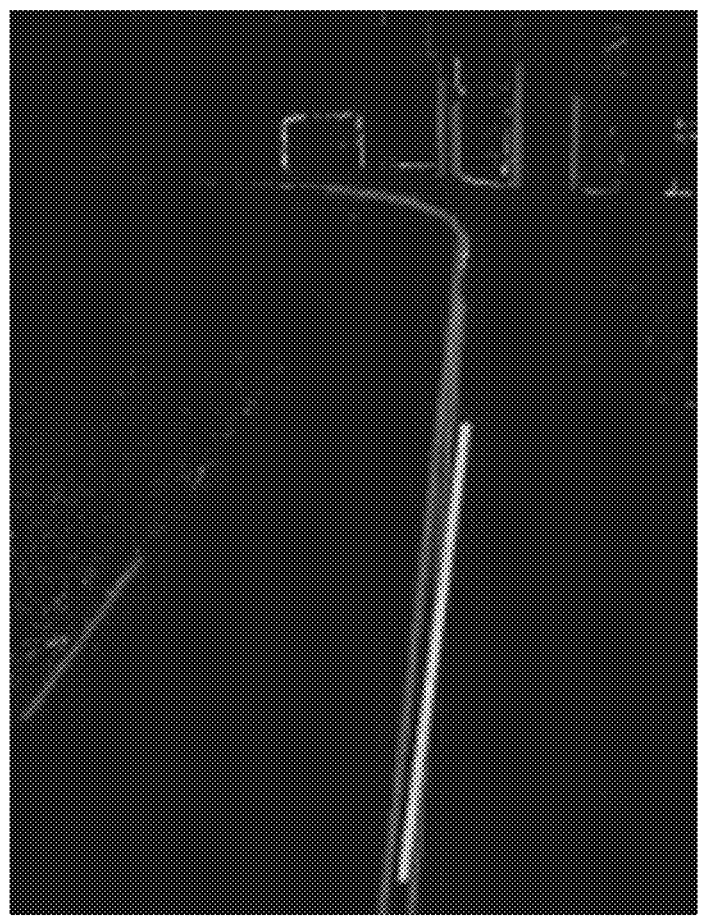
FIG. 13C shows a further illustration of line detection according to various embodiments.

FIG. 13C shows how the control logic may add a trajectory plan to the image based on identified features in the environment 1304 of line detection according to various embodiments.

According to various embodiments, a low resolution greyscale image may be captured from the Android device. 320 by 240 pixels may be sufficient for the AutoBike. OpenCV functions may thereafter be used for processing the image data. A high-pass filtering operation may be performed to identify the white regions of the scene, which may then be processed through a Canny edge detection filter and probabilistic Hough line detection filter. The outputs of these filters may highlight the line segments which are of interest to the AutoBike which may then be fed into a modified RANSAC algorithm with rules limiting certain slopes and positions for each line segment. This may find the optimal line to follow while ignoring irrelevant horizontal lines and others from the surroundings which are not part of the path to travel.

After finding the optimal line to follow, it may be used in a decision tree voting structure which determines which direction the bike needs to move. Based on rules from the positioning of the line in the image space and the angles associated with said lines, it may determine the optimal angle which to turn the AutoBike. In the case that there is not enough information to decide which way the AutoBike should turn it may fall back into a safety mode where another control strategy takes over, where either teleoperation or autonomy based on learned human actions during previous failure events may be applied.

In the following, teleoperation and path marking according to various embodiments will be described.

At any time the AutoBike may be directly controlled by the human operator through teleoperation. In this mode, the scene in front of the bike may be streamed through the webserver to the driver with minimal latency. The driver may control the system through a joystick control which may allow the AutoBike to navigate through difficult situations. In case of the vision system unable to determine the correct direction to travel, the system may prompt for human intervention and may record the actions performed by the driver. These recorded actions then go on to help train the AutoBike for later trials. If the bike experiences issues in the same location repeatedly, then the system may use the previously recorded actions to navigate the area. These recordings may be stored on the server and the route may be transmitted to the controller once the vision system has failed.

Due to limitations with the Android operating system, the camera peripheral may not be accessed by both WebRTC (web real time control) and the computer vision algorithms concurrently. A consequence of this may be that while the bike is in autonomous mode, no video output may be streamed using WebRTC. To counter this, a system may be provided wherein a rapid sequence of highly compressed JPEG images output from the computer vision algorithms may be sent in place of the WebRTC stream. As remote control operations may not be used in this state, a lower framerate and higher compression ratio may be used to maintain the same level of bandwidth consumption while still allowing remote operators to observe the general behavior and state of the bike while it is in autonomous mode.

According to various embodiments, the vehicle may deposit markings which the fleet of bicycles may use to decide on their location and actions at a given time. For example, the bicycle operation may benefit significantly from the ability to localize based on relative position from a known set of symbols on the pavement. According to various embodiments, the vehicles may mark areas where human teleoperators may need to consistently step in to navigate difficult intersections of other challenging environments.

To accomplish this behavior, a paint containing pigments which phosphoresce under UV light may be deposited automatically, or under the discretion of a human operator, through a set of selectable stencils to encode information. The information may then be sensed using a second image sensor mounted in a dark container with a UV light source.

Figure 14:
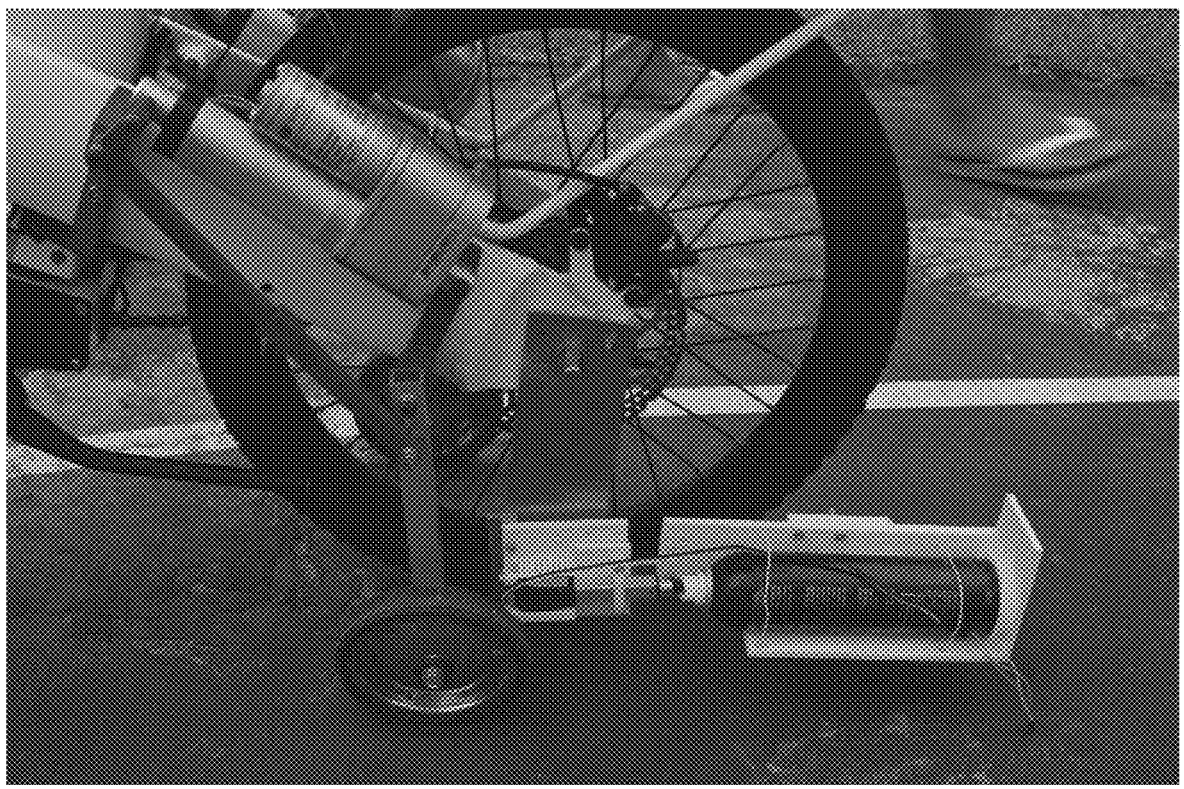
FIG. 14 shows a path marking system according to various embodiments.

FIG. 14 shows a path marking system 1400, displaying aerosol delivery of UV-luminescent pigments according to various embodiments.

In the following, server control systems according to various embodiments will be described.

According to various embodiments, a web server and communications solution may be provided for monitoring and controlling the autonomous package over existing IP-based networks. The Node.js-based server platform may be easily scalable due to its simplicity, which may allow for management of a large bicycle fleet in the future. To ensure message integrity, the server may actively check transmission latency between all clients connected. For clients, messages received after timeout or with bad checksums may be discarded, and relevant fail-safe mechanisms invoked.

The server control system according to various embodiments may enable full-duplex data as well as real-time Audio/Video transmission between clients. The data channel may be used for telemetry and remote control, while the multimedia channel provides feedback to manual remote operators. Optimizations such as data compression may be used to minimize transmission delay. Furthermore, Audio/Video streaming from bicycles to operator consoles utilizes point-to-point WebRTC technology, which may decrease delay as it bypasses the central server.

According to various embodiments, during development, a gaming steering wheel may be used as the Human Interface Device for throttle and steering control. The operator console may stream inputs from the gaming steering wheel to the server, which then relays the information to the bicycle.

According to various embodiments, the interface may also provide controls and information displays to aid in remote navigation of the vehicle.

Figure 17:
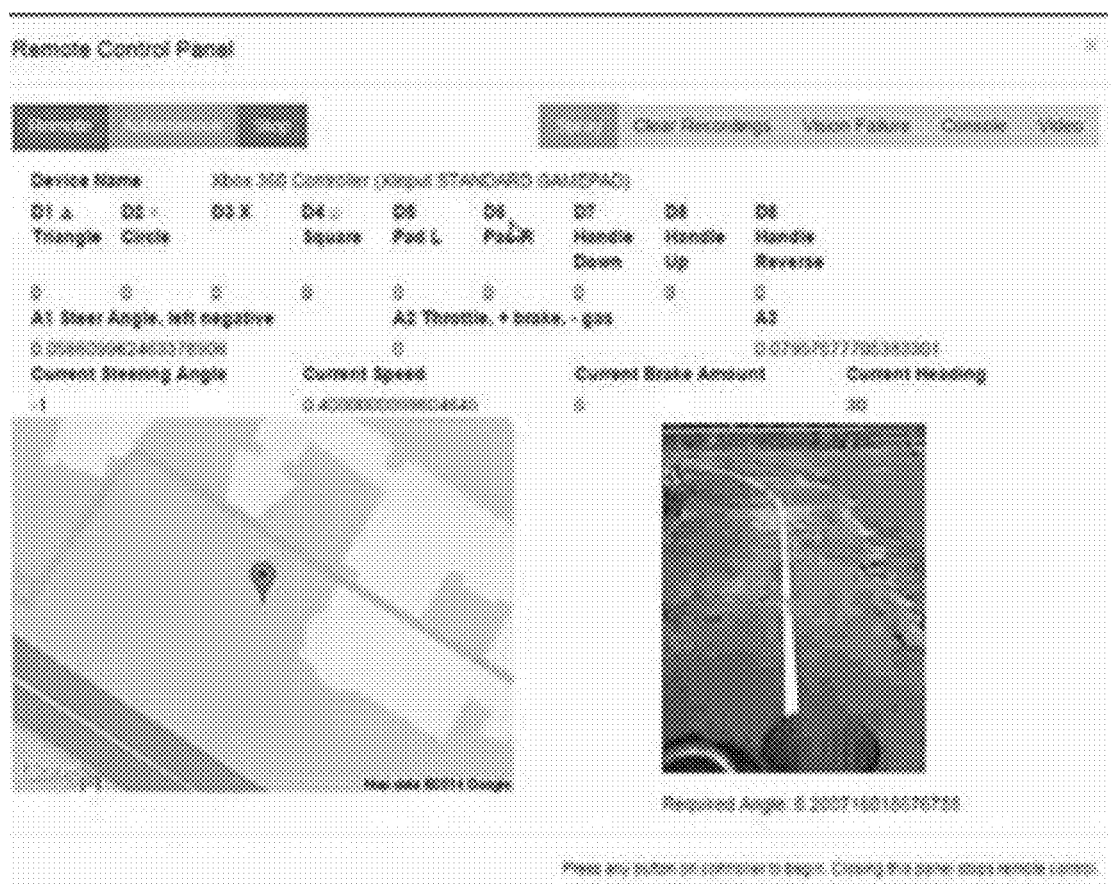
FIG. 17 shows a screenshot of a control interface according to various embodiments.

FIG. 17 shows a screenshot 1700 of a control interface according to various embodiments.

According to various embodiments, a map with the current location of the vehicle, as well as the remote video feed, may be displayed. Buttons to switch between autonomous, remote-control and emergency stop modes may be provided, as well as a visual indication of the mode the vehicle is currently in. Further, a message console may be provided which may allow the vehicle to issue textual debug and status messages to the human operator.

According to various embodiments, internal to the autonomous package, a USB-based UART (Universal Asynchronous Receiver-Transmitter) communications solution may be provided for interfaces between the Android smartphone and Embedded Controller. The custom external communications solution may provide a full-duplex data channel with Cyclic Redundancy Check checksum support, ensuring a high-speed reliable delivery of binary data. A messaging protocol may govern the specific composition of messages exchanged in this channel.

In the following, rebalancing and business models according to various embodiments will be described.

A Mobility-on-Demand (MOD) shared vehicle system according to various embodiments may provide convenient availability of vehicles to users upon demand. According to various embodiments, a system may be provided where robotic self-driving vehicles rebalance themselves to ensure acceptable coverage area and have the ability to travel to users upon demand, thus reducing overall the trip time and inconvenience for users.

In the following, a dynamic system model according to various embodiments will be described.

According to various embodiments, a dynamic model may be provided to contrast station based bike sharing model with an autonomous model according to various embodiments. The model may calculate the average trip time for a number of trips given a system coverage area and uniform demand. Ratios for the number of bikes, docking slots and stations may be set based on empirical data from various public data on the station based models. Bicycles may not be available for an unlimited time. While fleet rebalancing may be present to deal with general usage trends based on historic demand, the dynamic model may simulate situations where some stations do not have bikes present due to real time inventory.

An autonomous bike sharing system with an equal number of total bikes is contrasted with a standard station-based MoD system using a simulation model. A simplified system model is show in FIG. 15A and FIG. 15B.

Figure 15A:
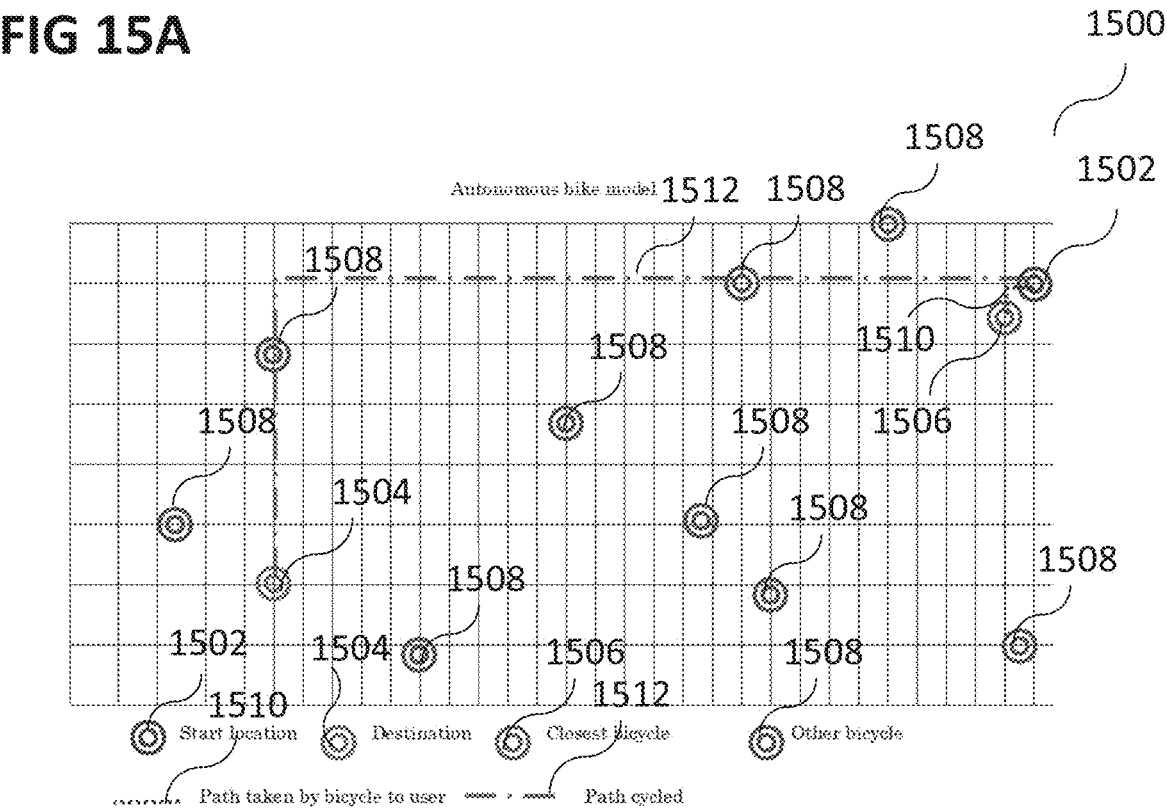
FIG. 15A shows an illustration of an autonomous rebalancing system according to various embodiments.

FIG. 15A shows an illustration 1500 of an autonomous rebalancing system according to various embodiments. A start location 1502, a destination 1504, a closest bicycle 1506, other bicycles 1508, a path 1510 taken by a bicycle to the user, and a path 1512 cycled are shown.

Figure 15B:
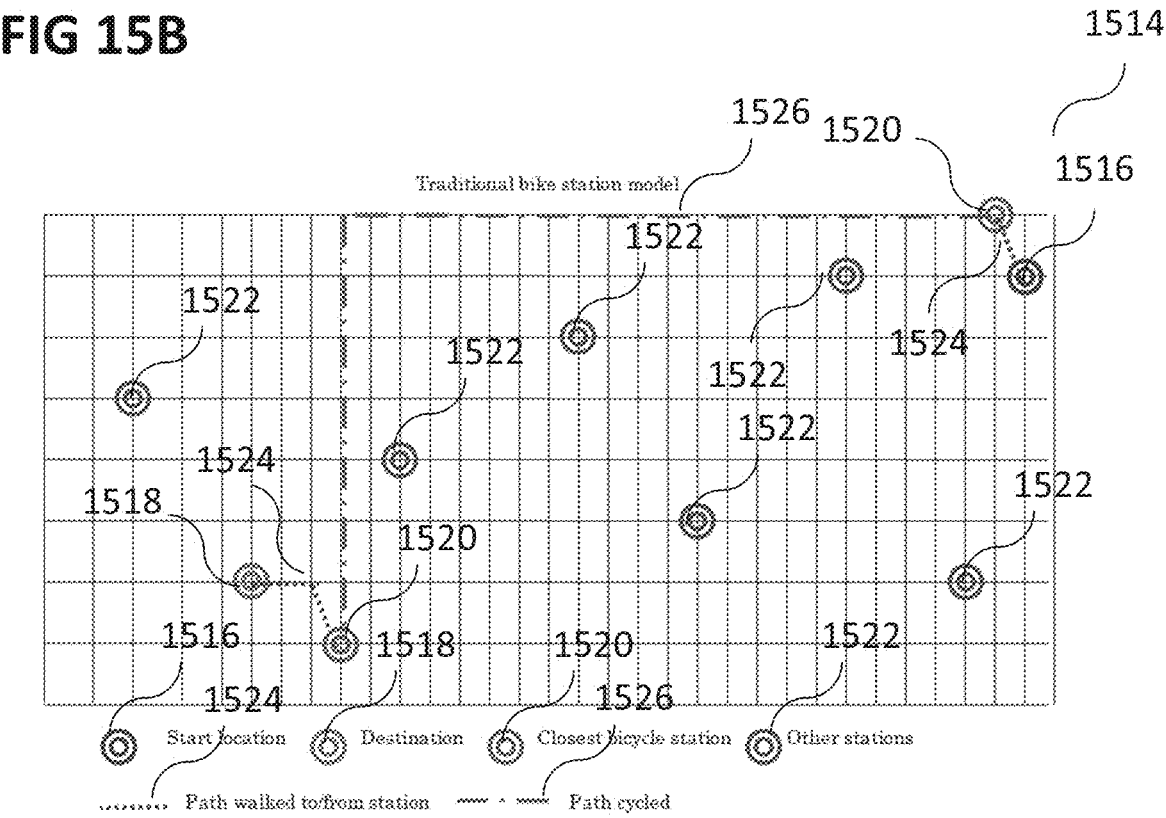
FIG. 15B shows an illustration of station-based mobility-on-demand systems.

FIG. 15B shows an illustration 1514 of station-based mobility-on-demand systems. A start location 1516, a destination 1518, closest bicycle stations 1520, other stations 1522, a path 1524 walked to (or from) a station, and a path 1526 cycled are shown.

The trip time for the autonomous system may be the sum of the time waiting for the bicycle to arrive where it is needed and the time taken to cycle to the destination. The trip time for the station-based system may be the sum of the walking time to the station, time to cycle to the next open station, and then the time to walk from station to destination, where walking time is Euclidian distance, and cycling and autonomous driving time is calculated using Manhattan distance.

Figure 16:
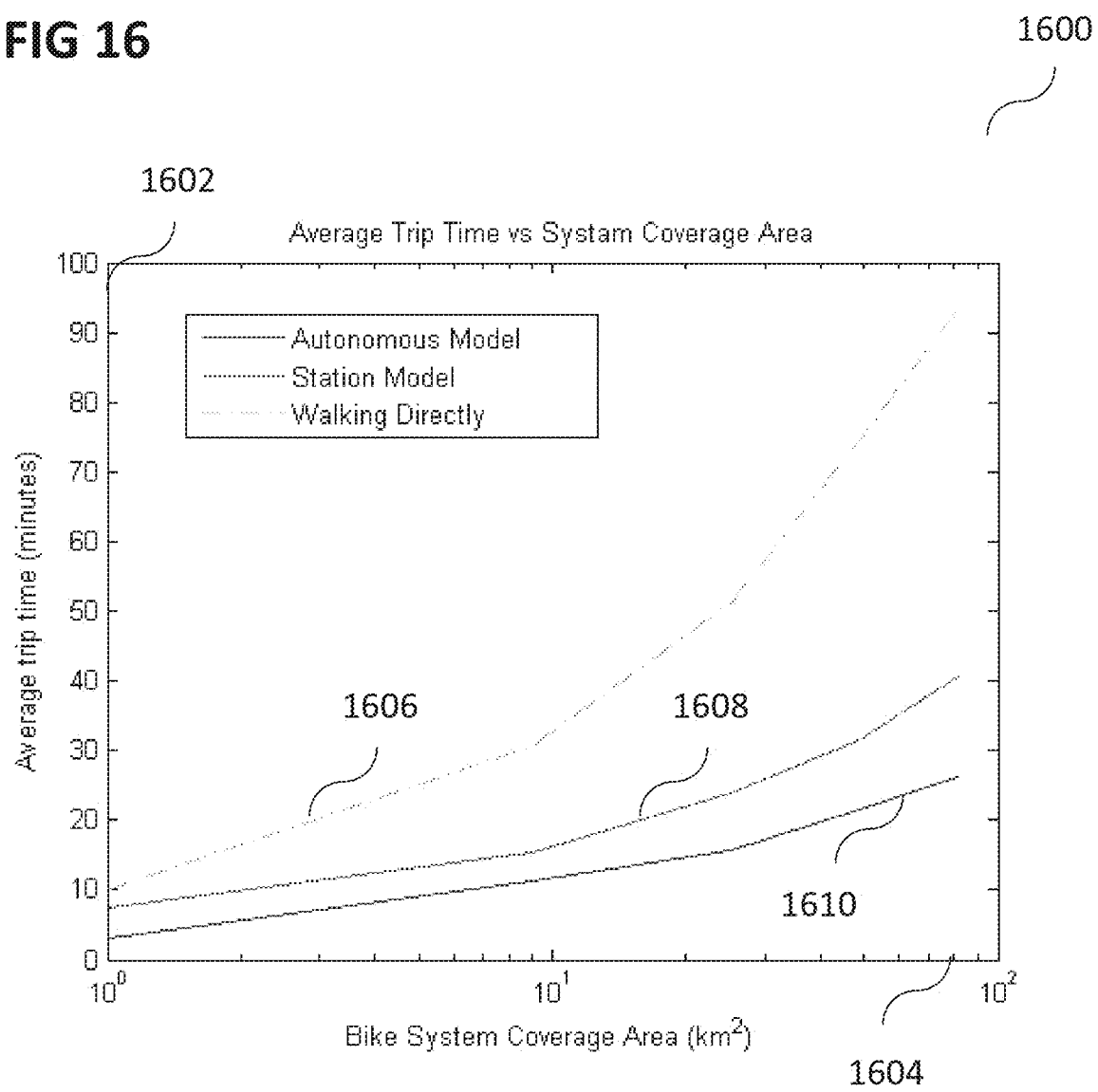
FIG. 16 shows a diagram illustrating the benefit of the autonomous mobility on demand (MoD) rebalancing model increasing as the coverage area increases.

The results of the model are shown in FIG. 16.

FIG. 16 shows a diagram 1600 illustrating the benefit of the autonomous mobility on demand (MoD) rebalancing model increasing as the coverage area increases. A vertical axis 1602 indicates the average trip time in minutes. A horizontal axis 1604 illustrates the bike system coverage area in square kilometers. A curve 1606 related to walking directly, a curve 1608 related to a station model, and a curve 1610 related to an autonomous model according to various embodiments are shown.

The largest contributor to trip time may be walking which is fairly insignificant in smaller coverage areas. For short distances and coverage area, both systems provide adequate service and feasibility in usage, but as the system coverage area increases, autonomous bike sharing models may make a larger improvement due to the reduction in walking time. This may make such a system according to various embodiments feasible both in densely populated areas and in areas where a traditional bike sharing model would be unpractical.

According to various embodiments, a remote control of the platform may be provided, providing a communications backend and simple control code for Control module.

According to various embodiments, a safety module may be provided on BeagleBone and custom PCB (printed circuit board); this may provide a prototyping platform for research in autonomous operation.

According to various embodiments, a navigation module may be provided on Android. According to various embodiments, a real-time controller may be provided, utilizing computer vision, global navigation satellite systems, and other technologies.

According to various embodiments, the controller may be platform independent. An underlying sensing technology (for example employing vision, ink deposition and IMU (Inertial Measurement Unit)), for example with sensor fusion, may be provided. According to various embodiments, a vehicle may be provided with a low-cost, ruggedized controller design, which may be fundamentally stable in all operating modes, and which may be able to handle both commuter and assisted mobility use scenarios. According to various embodiments, autonomy and control may be provided. According to various embodiments, light-weight methods may be provided for processing visual information for SLAM (simultaneous localization and mapping) and object detection and avoidance, the storage may be centralized, and processing of SLAM data using video capture from vehicles travelling various routes to build a global map of the service area may be provided.

According to various embodiments, sensor fusion methods (e.g. Extended Kalman Filters) may be provided to process data from vision, speed sensors, and inertial measurement units (IMU), and deposited ink may give better estimates.

Various embodiments may enable self-driving vehicle methods to perform on low-cost hardware by leveraging the advantages of slow-speed vehicles to reduce sensing and control processing loads.

According to various embodiments, a method for identifying safe passable area using vision sensors may be provided. According to various embodiments, a method for acquiring passive physical signals using vision sensors may be provided. According to various embodiments, materials and systems for depositing, refreshing, and erasing physical signals may be provided. According to various embodiments, a method for seamlessly fusing human and autonomous driving may be provided. According to various embodiments, a method for autonomously rebalancing vehicle fleets may be provided. According to various embodiments, a method for autonomously delivering packages may be provided.

According to various embodiments, devices or systems (for example referred to as GAC) and methods may be provided for a self-redistributing shared mobility fleets.

Despite significant interest and large-scale worldwide deployment, urban bicycle and scooter sharing systems suffer from significant drawbacks resulting in a reduction in overall impact. Foremost among these problems are the difficulties presented in rebalancing the vehicle fleets to optimally serve demand with supply in real-time, as well as the substantial costs of damage and theft.

According to various embodiments, the GAC technology platform provides rebalancing, damage, kiosk space, and real-time demand management by enabling vehicles to cruise autonomously while rider-less, and provide route guidance and rider monitoring while ridden. The GAC according to various embodiments provides the following:

Self-driving when not being rented and ridden, removing the need for rental kiosks;
  recognizing road boundaries and traffic signals, and to self-right if tipped;
  automatic renting either on-the-fly, or via pre-booking on a smartphone;
  cost efficiency.

According to various embodiments, devices and methods for 'Mobility on Demand' management may be provided.

According to various embodiments, autonomous vehicle data collection and processing structures, including the processing and archiving of video streams may be provided.

According to various embodiments, fusion of present and historical rental and public data streams to predict demand for shared mobility may be provided.

According to various embodiments, extension and validation of optimization paradigms for shared mobility systems to include self-driving resources may be provided.

According to various embodiments, experimental investigation of pricing signals on self-rebalancing fleet technology may be provided.

According to various embodiments, the GAC may provide assisted mobility systems for the elderly. The demand for ways to enable mobility for elderly citizens will rise proportionally to the percentage of the population in that demographic. This demand will be compounded by the increasing fraction of people living in urban areas where assistive technologies such as light electric vehicles may be practical. The GAC according to various embodiments may improve the safety of existing electric mobility devices substantially, and may enable elderly with diminished sensing and actuation capabilities to continue to enjoy the same standards of freedom of mobility as other citizens.

According to various embodiments, the GAC may provide for automated last-mile logistics, which may also be referred to as 'self-delivering packages'. Systems according to various embodiments may involve very light electric mobility systems to bring packages from final distribution points to end-points effectively. The GAC be suited to this application due to its preference for non-safety critical systems and ability to be implemented at low cost and complexity. An additional synergy exists in the increasing trend for real-time tracking of parcels, something which the GAC automatically enables.

Various embodiments may be applied anywhere in the world where electric mobility systems for the aged, mobility on demand systems, or advanced logistics systems are being considered.

According to various embodiments, mobility on demand, for example for bike-sharing, may be provided. On-campus last-mile systems such as those operated by heavy manufacturing operations such as mines, aircraft production, and data centers who currently invest in electric light duty vehicles for moving personnel may use a system according to various embodiments.

Many developed countries face aging demographics due to increases in life expectancies. According to various embodiments, aging population mobility aids may be provided.

According to various embodiments, advanced logistics systems may be provided. Various embodiments may provide a system for packages which deliver themselves.

According to various embodiments, an autonomous bicycle for self-rebalancing Mobility on Demand fleets may be provided.

It will be understood that any reference herein to GAC (General Autonomy Controller) or "AutoBike" may relate to various devices and/or methods according to various embodiments.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A vehicle comprising:
a sensor configured to sense a marking under a first lighting condition, wherein the marking is at least substantially not visible to a human eye under a second lighting condition;
a localization circuit configured to determine a location of the vehicle based on the sensing of the sensor; and
a marking deposition device configured to deposit a material which is at least substantially not visible to the human eye under the second lighting condition, to create markings on paths on which the vehicle travels,
wherein the second lighting condition comprises a lighting condition with light in a wavelength range between 380 nm and 780 nm,
wherein the first lighting condition is different from the second lighting condition with respect to wavelength, and
wherein the material is visible to the human eye under the first lighting condition.

2. The vehicle of claim 1, wherein the marking comprises an engraving with a length in a range between 0.1 mm and 100 mm, and/or wherein the marking comprises an engraving with a width in a range between 0.1 mm and 100 mm.

3. The vehicle of claim 1, wherein the marking comprises a chemical substance which is configured to be sensed using chemosensing.

4. The vehicle of claim 1, further comprising:
a mapping circuit configured to determine a map of an environment of the vehicle.

5. The vehicle of claim 4, wherein the localization circuit and the mapping circuit are configured to carry out simultaneous localization and mapping.

6. The vehicle of claim 1, further comprising:
at least one of an actuator,
an actuation controller configured to control actuation of the vehicle based on the determination of the localization circuit, or a failure detection circuit configured to detect a failure of the vehicle.

7. The vehicle of claim 1, further comprising:
an exception detection circuit configured to detect an exception in an operation of the vehicle.

8. The vehicle of claim 7, wherein the exception comprises at least one item from the list of items consisting of: the vehicle approaching a crossing; the vehicle standing at a crossing; the vehicle approaching a junction; the vehicle standing at a junction; the vehicle approaching another vehicle; another vehicle approaching the vehicle; an accident; the vehicle approaching a person; and a person approaching the vehicle.

9. The vehicle of claim 1, further comprising:
a communication circuit configured to communicate with a human operator when an exception is detected.

10. The vehicle of claim 9, wherein the communication circuit is further configured to receive remote control instructions from the human operator.

11. The vehicle of claim 10, wherein the vehicle is configured to operate according to the remote control instructions.

12. The vehicle of claim 11, further comprising:
a learning circuit configured to learn a desired behavior in response to an exception based on the remote control instructions.

13. A vehicle controller system comprising:
a marking deposition device configured to be coupled to a vehicle, the marking deposition device configured to deposit a material which is visible to a human eye under a first lighting condition to create markings on paths on which the vehicle travels, wherein the material is at least substantially not visible to the human eye under a second lighting condition;
a sensor configured to sense a marking under the first lighting condition, wherein the marking is at least substantially not visible to the human eye under the second lighting condition, wherein the second lighting condition comprises a lighting condition with light in a wavelength range between 380 nm and 780 nm, and wherein the first lighting condition is different from the second natural lighting condition with respect to wavelength; and a localization circuit configured to determine a location of the vehicle based on the sensing of the sensor.

14. The vehicle controller system of claim 13, wherein the marking deposition device comprises at least one of:

an engraving device;

a marking controller configured to control providing of the marking;

a marking quality determination circuit configured to determine a quality of a marking; or a marking removing member configured to remove an existing marking.

15. A method for controlling at least one vehicle, the method comprising:

depositing a material to create markings on paths on which the vehicle travels using a marker deposition device coupled to the vehicle, wherein the material is at least substantially not visible to a human eye under a second lighting condition;

sensing a marking under a first lighting condition using a sensor coupled to the vehicle, wherein the marking is at least substantially not visible to the human eye under the second lighting condition, wherein the second lighting condition comprises a lighting condition with light in a wavelength range between 380 nm and 780 nm;

wherein the first lighting condition is different from the second lighting condition with respect to wavelength; and determining a location of the vehicle based on the sensing.

16. The method of claim 15, further comprising at least one of:

actuating the vehicle using an actuator;

controlling actuation of the vehicle based on determining the location; or detecting a failure of the vehicle.

17. The method of claim 15, further comprising:

engraving a marking.

18. The method of claim 15, further comprising:

controlling each vehicle of the at least one vehicle based on at least one of a history of usage patterns of the at least one vehicle or publicly available transportation system information.

* * * * *